United States Patent
Qiu

(10) Patent No.: US 10,771,307 B2
(45) Date of Patent: Sep. 8, 2020

(54) METHOD AND SYSTEM FOR INTER-DEVICE SERVICE ACCESS

(71) Applicant: Alibaba Group Holding Limited, George Town (KY)

(72) Inventor: Shaoxiang Qiu, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 16/137,831

(22) Filed: Sep. 21, 2018

(65) Prior Publication Data

US 2019/0097867 A1    Mar. 28, 2019

Related U.S. Application Data

(63) Continuation-in-part of application No. PCT/CN2017/076227, filed on Mar. 10, 2017.

(30) Foreign Application Priority Data

Mar. 22, 2016    (CN) .......................... 2016 1 0166346

(51) Int. Cl.
*H04L 29/08* (2006.01)
*H04L 12/407* (2006.01)
*H04L 29/12* (2006.01)
*H04L 29/06* (2006.01)
*G06F 9/54* (2006.01)
(Continued)

(52) U.S. Cl.
CPC .......... *H04L 29/08765* (2013.01); *G06F 9/54* (2013.01); *H04L 12/407* (2013.01); *H04L 29/08648* (2013.01); *H04L 29/08882* (2013.01); *H04L 61/35* (2013.01); *H04L 63/10* (2013.01); *H04L 67/10* (2013.01); *H04L 67/40* (2013.01); *H04W 12/003* (2019.01); *H04W 4/40* (2018.02); *H04W 12/0609* (2019.01)

(58) Field of Classification Search
CPC ... H04L 29/08765; H04L 67/10; H04L 67/40; H04L 29/08648; H04L 63/10; H04L 61/35; H04L 12/407; H04L 29/08882; H04L 67/2861; H04L 41/0803; H04L 12/04; H04W 12/0609; H04W 4/40; G06F 9/54

See application file for complete search history.

(56) References Cited

U.S. PATENT DOCUMENTS 6,339,795 B1    1/2002    Narurkar
8,244,179 B2    8/2012    Dua
(Continued)

FOREIGN PATENT DOCUMENTS

CN    101714945    5/2010
CN    104113935    10/2014
(Continued)

*Primary Examiner* — Dady Chery
(74) *Attorney, Agent, or Firm* — Van Pelt, Yi & James LLP

(57) ABSTRACT

Inter-device service access is disclosed including issuing, by a source device running a first program, an access request by the first program for a specific service, and transmitting, by the source device running the first program, the access request through an inter-device link to a target device that provides the specific service, the target device being configured to receive the access request, forward the received access request to a second program running on the target device, the second program executing a corresponding service function.

28 Claims, 17 Drawing Sheets

(51) Int. Cl.
　　　*H04W 12/00*　　(2009.01)
　　　*H04W 4/40*　　　(2018.01)
　　　*H04W 12/06*　　(2009.01)

(56)　　　　　　　References Cited

U.S. PATENT DOCUMENTS

2002/0068584 A1　　6/2002　Gage
2012/0166608 A1　　6/2012　Ogata
2014/0189117 A1*　 7/2014　Niimura .................. H04L 67/16
　　　　　　　　　　　　　　　　　　　　　　　709/225

FOREIGN PATENT DOCUMENTS

| CN | 104467923 | 3/2015 |
| CN | 105100034 | 11/2015 |
| CN | 105323310 | 2/2016 |
| CN | 105376299 | 3/2016 |

* cited by examiner

9100

91500

1300

US 10,771,307 B2

METHOD AND SYSTEM FOR INTER-DEVICE SERVICE ACCESS

CROSS REFERENCE TO OTHER APPLICATIONS

This application is a continuation-in-part of and claims priority to International (PCT) Application No. PCT/CN2017/76227, entitled ACCESS METHOD, CONFIGURATION METHOD AND APPARATUS USED FOR INTER-DEVICE SERVICE, filed Mar. 10, 2017 which is incorporated herein by reference for all purposes, which claims priority to China Application No. 201610166346.8, entitled ACCESS METHOD, CONFIGURATION METHOD, AND MEANS FOR INTER-DEVICE SERVICES, filed Mar. 22, 2016 which is incorporated herein by reference for all purposes.

FIELD OF THE INVENTION

The present application relates to a method and a system for inter-device service access.

BACKGROUND OF THE INVENTION

As computer and network technology develop, personal computers, smart phones, and other electronic devices have become widely used. These electronic devices not only can have application programs installed on them to provide users with a wide variety of functions such as music playing and data storage, but also can include service providers that provide the application programs with services through specific access interfaces. These service providers can be application programs or system programs.

Many inter-process communication (IPC) mechanisms have appeared in specific applications to facilitate communication between application programs and between application programs and system programs to meet service access actions to be performed between different programs. Communication between program processes is implemented based on these IPC mechanisms. D-Bus is one of the IPC mechanisms. D-Bus provides communication for processes in a Linux desktop environment. At the same time, D-Bus can transmit events under both Linux desktop environment and Linux kernel as messages to processes and can implement various complex inter-process communication tasks.

As an aspect, D-Bus is limited to communication between applications within a single device. D-Bus is unable to meet inter-device service access needs. For example, a vehicle-mounted system includes multiple electronic devices such as a smart phone and a Wi-Fi speaker system. The functions provided by each device are mutually independent. In the event that the user would like to listen to music in a certain electronic device (such as, for example, a smart phone), the device may not be capable of performing an audio playing function because of an audio hardware failure. As a result, the user may give up on listening to music or may have to manually copy a desired song into the storage media of the Wi-Fi speaker system to play music or the desired song. The service functions currently provided between devices are mutually independent and cannot be used conveniently by users affecting the user experience of these functions.

SUMMARY OF THE INVENTION

Embodiments of the present application disclose inter-device service access facilitating use of such inter-device functions. The present application further provides a process and a system for inter-device service access.

The present application provides a process for inter-device service access, comprising:
issuing an access request of a first program for a specific service by a source device running said first program;
transmitting the access request through an inter-device link to a target device that provides the specific service;
the target device forwards the received access request to a second program running on the target device, the second program executing a corresponding service function;

In some embodiments, the inter-device link comprises: a link established separately by each device with a master device through a link port provided by the master device.

In some embodiments, the inter-device link is established in advance in the following manner:
the master device creates a link port for establishing links with other devices;
in the event that the source device is a non-master slave device, the source device sends a link request to the link port, and the master device establishes a data connection based on the received link request between the master device and the source device to perform a linking process between the source device and master device;
in the event that the target device is a non-master slave device, the target device sends a link request to the link port, and the master device establishes a data connection based on the received link request between the master device and the target device to complete the linking process between the target device and master device.

In some embodiments, the operation by which the master device creates a link port and establishes a data connection with a slave device based on a received link request is executed by a bus control module on the master device;
the operation by which the slave device establishes a data connection with the master device by sending a link request is executed by a bus client module on the slave device.

In some embodiments, the issuing of the access request of a first program for a specific service by a source device running the first program and the transmitting of the access request through an inter-device link to a target device that provides the specific service comprises:
encapsulating, using the source device, the access request based on pre-stored service configuration information to obtain an encapsulated access request and issuing the encapsulated access request, and transmitting the encapsulated access request via an inter-device link in accordance with the target device identifier included in the encapsulated access request to the target device that provides the specific service, the access request including a service identifier of the specific service of the first program and the target device identifier;
the target device forwards the received access request to a second program running on the target device, and the second program executes a corresponding service function comprises:
the target device forwards, based on pre-stored service configuration information, the access request to the second program running on the target device, and the second program executes a corresponding service function.

In some embodiments, the service configuration information of the source device includes at least one remote service configuration item having the following information: the target device identifier and a service identifier of the specific service, the service identifier including a service name;
the service configuration information of the target device includes at least one local service configuration item having the following information: a service identifier of the specific service and an identifier of the second program process providing the specific service.

In some embodiments, the generating of the service configuration information of the source device comprises:

the target device issues a service mount request including a target device identifier and a service identifier of the specific service and transmits the service mount request via the inter-device links to various devices including the source device;

the source device generates, based on the received service mount request, a remote service configuration item including the target device identifier and the service identifier of the specific service and adds the remote service configuration item to the service configuration information of the source device.

In some embodiments, the target device generates the service mount request as follows:

the second program registers the specific service that the second program provides in the service configuration information of the target device and generates, within the service configuration information, a corresponding local service configuration item;

the target device generates the service mount request based on the service identifier of the specific service included in the local service configuration item and the target device identifier.

In some embodiments, in the event that the source device is a master device, the source device encapsulates an access request based on pre-stored service configuration information and issues the encapsulated access request, and the transmitting of the access request via an inter-device link in accordance with the target device identifier included in the encapsulated access request to the target device that provides the specific service comprises:

the source device encapsulates an access request by looking up pre-stored service configuration information, the access request including a service identifier of the specific service of the first program and the target device identifier;

the source device sends, using an established link, the access request to the target device based on the target device identifier included in the encapsulated access request.

In some embodiments, in the event that the target device is a master device, the source device encapsulates an access request based on pre-stored service configuration information and issues the encapsulated access request, and the transmitting of the encapsulated access request via an inter-device link based on the target device identifier included in the encapsulated access request to the target device that provides the specific service comprises:

the source device encapsulates an access request by looking up pre-stored service configuration information, the access request including a service identifier of the specific service of the first program and the target device identifier;

the source device sends the encapsulated access request to the target device based on an established link with the target device.

In some embodiments, in the event that neither the source device nor the target device is a master device, the source device encapsulates an access request based on pre-stored service configuration information and issues the encapsulated access request, and the transmitting of the access request via an inter-device link based on the target device identifier included in the encapsulated access request to the target device that provides the specific service comprises:

the source device encapsulates an access request by looking up pre-stored service configuration information, the access request including an identifier of the specific service of the first program and the target device identifier;

the source device sends the encapsulated access request to the master device based on an established link with the master device;

the master device, based on an established link with the target device, sends the access request to the target device based on the target device identifier included in the received access request.

In some embodiments, the target device forwards, based on pre-stored service configuration information, the access request to the second program running on the target device, and the second program executes a corresponding service function comprises:

the target device, after receiving the access request, executes a decapsulating operation to acquire the accessed service identifier;

the target device, based on the accessed service identifier, looks up a local service configuration item in service configuration information and acquires the identifier of a second program process that provides the corresponding service;

the target device forwards the decapsulated access request to the second program based on the identifier of the second program process, and the second program executes a corresponding service function.

In some embodiments, the information in the remote service configuration item corresponding to the specific service in the service configuration information of the source device further comprises: an agent identifier, an agent corresponding to the agent identifier being generated during the generating of the remote service configuration item and responsible for providing agent service, which includes an encapsulating function for accessing the specific service;

the source device encapsulates an access request by looking up pre-stored service configuration information, the access request including a service identifier of the specific service of the first program and the target device identifier comprises:

the first program looks up service configuration information based on the service identifier of the specific service and acquires the agent identifier for providing agent service for accessing the specific service;

the first program sends, based on the agent identifier, an access request including the service identifier of the specific service to the corresponding agent, and the agent encapsulates the target device identifier for the access request.

In some embodiments, the first program looks up service configuration information based on the service identifier of the specific service and acquires the agent identifier for providing agent service for accessing the specific service comprises:

the first program looks up service configuration information based on the service identifier of the specific service;

in the event that the service configuration information includes two or more remote service configuration items corresponding to the service identifier of the specific service, selecting, based on a preset priority level rule, an agent identifier in one of the remote service configuration items as the agent identifier for providing agent service for accessing the specific service.

In some embodiments, a bus control module on a master device executes the operations of the master device forwarding messages between non-master slave devices, forwards messages between the master device and slave devices, and provides agent service;

a bus control module on a slave device executes forwarding messages between the slave device and a master device and provides agent service.

In some embodiments, issuing an access request of a first program for a specific service by a source device running the first program and transmitting the access request through an inter-device link to a target device that provides the specific service comprises: the master device determines, based on a preset message forwarding rule, whether to forward the access request based on an inter-device link and in response to a determination that the master device determines whether to forward the access request, and whether to execute a corresponding forwarding operation.

In some embodiments, after the target device forwards the received access request to a second program running on the target device, the transmitting of the access request further comprises:

the target device issues second program response information regarding the access request and transmits the second program response information via the inter-device link to the source device;

the source device sends the received response information back to the first program.

In some embodiments, the quantity of master devices is greater than 1, and the master devices are cascaded relative to each other, each non-master device being subordinate to one master device;

the inter-device links comprise: links established separately by each different device with a master device through a link port provided by its master device and cascaded links between master devices.

In some embodiments, the link port comprises: a TCP port or a UDP port.

In some embodiments, the process applies to a vehicle-mounted system, and the specific service comprises: an audio playing service; the source device comprises: a smart phone; and the target device comprises: a vehicle-mounted speaker device;

the issuing of the access request of a first program for a specific service by a source device running the first program and the transmitting of the access request through an inter-device link to a target device that provides the specific service comprises: a first program issuing an access request for an audio playing service by a smart phone running the first program; transmitting the access request via inter-device links to a vehicle-mounted speaker device that provides the audio playing service;

the target device forwards the received access request to a second program running on the target device, and the second program executes a corresponding service function comprises: the vehicle-mounted speaker device forwards the received access request to an audio playing program that is running on the vehicle-mounted speaker device, and the audio playing program executes a corresponding audio playing function.

In some embodiments, the process applies to a vehicle-mounted system, and the specific service comprises: a video playing service; the source device comprises: a smart phone; and the target device comprises: a vehicle-mounted DVD player;

the issuing of the access request of a first program for a specific service by a source device running the first program and the transmitting of the access request through an inter-device link to a target device that provides the specific service comprises: issuing an access request of a first program for a video playing service by a smart phone running the first program and transmitting the access request via inter-device links to a vehicle-mounted DVD player that provides the video playing service;

the target device forwards the received access request to a second program running on the target device, and the second program executes a corresponding service function comprises: the vehicle-mounted DVD player forwards the received access request to a video playing program that is running on the vehicle-mounted DVD player, and the video playing program executes a corresponding video playing function.

In some embodiments, the process applies to a vehicle-mounted system, and the specific service comprises: a data storage service; the source device comprises: a smart phone; and the target device comprises: a vehicle-mounted hard disk drive;

the issuing of the access request of a first program for a specific service by a source device running the first program and the transmitting of the access request through an inter-device link to a target device that provides the specific service comprises: issuing an access request of a first program for a data storage service by a smart phone running the first program and transmitting the access request via inter-device links to a vehicle-mounted hard disk drive that provides the data storage service;

the target device forwards the received access request to a second program running on the target device, and the second program executes a corresponding service function comprises: the vehicle-mounted hard disk drive forwards the received access request to the data storage program that is running on the vehicle-mounted hard disk drive, and the data storage program executes a corresponding data storage function.

In some embodiments, the process applies to a home entertainment system, and the specific service comprises: a video playing service; the source device comprises: a smart phone; and the target device comprises: a smart television or tablet computer;

the issuing of an access request of a first program for a specific service by a source device running the first program and the transmitting of the access request through an inter-device link to a target device that provides the specific service comprises: issuing an access request of a first program for a video playing service by a smart phone running the first program and transmitting the access request via inter-device links to a smart television or tablet computer that provides the video playing service;

the target device forwards the received access request to a second program running on the target device, and the second program executes a corresponding service function comprises: the smart television or tablet computer forwards the received access request to a video playing program that is running on the smart television or tablet computer, and the video playing program executes a corresponding video playing function.

The present application further provides a device for inter-device service access, comprising:

an access request transmitting unit, whereby a source device running a first program issues an access request of the first program for a specific service and transmits the access request through an inter-device link to a target device that provides the specific service;

a target service providing unit whereby the target device forwards the received access request to a second program running on the target device, and the second program executes a corresponding service function.

In some embodiments, the device comprises:

a link port creating unit, whereby the master device creates a link port for establishing links with other devices;

a source device linking unit, whereby in the event that the source device is a non-master slave device, the source device sends a link request to the link port, and the master device establishes a data connection based on the received link request between the master device and the source device to complete the linking process between the source device and master device;

a target device linking unit, whereby in the event that the target device is a non-master slave device, the target device sends a link request to the link port, and the master device establishes a data connection based on the received link request between the master device and the target device to complete the linking process between the target device and master device.

In some embodiments, the access request transmitting unit, whereby the source device encapsulates an access request based on pre-stored service configuration information and issues the access request, and transmits the access request via an inter-device link based on the target device identifier included in the access request to the target device that provides the specific service, the access request including a service identifier of the specific service of the first program and the target device identifier;

The target service providing unit, whereby the target device forwards, based on pre-stored service configuration information, the access request to the second program running on target device, and the second program executes a corresponding service function.

In some embodiments, the device comprises:

a target device service mount request transmitting unit, whereby the target device issues a service mount request including the target device identifier and a service identifier of the specific service and transmits the service mount request via the inter-device links to various devices including the source device;

a source device service configuration information storage unit, whereby the source device generates, based on the received service mount request, a remote service configuration item including the target device identifier and the service identifier of the specific service and adds the remote service configuration item to service configuration information of the source device.

In some embodiments, the device further comprises:

a local service registering unit, whereby the second program registers the specific service that the second program itself provides in the service configuration information of the target device and generates, within the service configuration information, a corresponding local service configuration item;

a service mount request generating unit is configured to generate the service mount request based on the specific service identifier included in the local service configuration item and the target device identifier.

In some embodiments, the access request transmitting unit includes:

an access request encapsulating unit, whereby the source device encapsulates an access request by looking up pre-stored service configuration information, the access request includes a service identifier of the specific service of the first program and the target device identifier;

a first access request sending unit, whereby the source device sends, based on an established link with the target device, the access request to the target device based on the target device identifier included in the encapsulated access request.

In some embodiments, the access request transmitting unit includes:

an access request encapsulating unit, whereby the source device encapsulates an access request by looking up pre-stored service configuration information, the access request includes a service identifier of the specific service of the first program and the target device identifier;

a second access request sending unit, whereby the source device sends, based on an established link with the target device, the encapsulated access request to the target device.

In some embodiments, the access request transmitting unit comprises:

an access request encapsulating unit, whereby the source device encapsulates an access request by looking up pre-stored service configuration information, the access request including a service identifier of the specific service of the first program and the target device identifier;

a third access request sending unit, whereby the source device sends, based on an established link with the master device, the encapsulated access request to the master device;

an access request forwarding unit, whereby the master device sends, based on an established link with the target device, the access request to the target device based on the target device identifier included in the received access request.

In some embodiments, the target service providing unit includes:

an access request receiving unit, whereby the target device, after receiving the access request, executes a decapsulating operation and acquires the accessed service identifier;

a target process looking-up unit, whereby the target device looks up a local service configuration item in service configuration information based on the accessed service identifier and acquires the identifier of a second program process that provides the corresponding service;

a target service providing unit, whereby the target device forwards the decapsulated access request to the second program based on the identifier of the second program process, and the second program executes the corresponding service function.

In some embodiments, the access request encapsulating unit comprises:

an agent identifier acquiring unit, whereby the first program looks up service configuration information based on the service identifier of the specific service and acquires the agent identifier for providing agent service for accessing the specific service;

an agent service encapsulating unit, whereby the first program sends, based on the agent identifier, an access request including the service identifier of the specific service to the corresponding agent, and the agent encapsulating the target device identifier for the access request.

In some embodiments, the device further comprises:

a response information transmitting unit, whereby after the target service providing unit completes execution of its function, the target device issues second program response information regarding the access request and transmits the access request via the inter-device link to the source device;

a response information returning unit, whereby the source device sends the received response information back to the first program.

In addition, the present application further discloses a process for configuring inter-device services, comprising:

the first device issuing a service mount request including a service identifier of a service provided by a first device and a first device identifier and transmits the service mount request via inter-device links to each device interconnected with a master device;

each device excluding the first device generates, based on the received service mount request, a remote service configuration item including the first device identifier and a service identifier of a service provided by the first device and adds the remote service configuration item to its own service configuration information.

The inter-device link comprises: a link established separately by each device with a master device through a link port provided by the master device.

In some embodiments, the first device generates the service mount request as follows:

application programs running on the first device register the services that each of the application programs provides in the service configuration information of the first device and generate local service configuration items within the service configuration information;

the first device generates the service mount request based on a service identifier included in the local service configuration item and a device identifier of the first device.

In some embodiments, after each device excluding the first device adds the remote service configuration item to its own service configuration information, the process further comprises:

the first device issues a service unload request including a service identifier of the service to be unloaded and transmits the service unload request via an inter-device link to each device interconnected with a master device;

each device excluding the first device deletes, based on the received service unload request, the remote service configuration item including the service identifier from service configuration information of the first device.

In some embodiments, in the event that the first device is not a master device, and after each device excluding the first device adds the remote service configuration item to its own service configuration information, the process further comprises:

the first device sends a device disconnect request to the master device, the device disconnect request including a first device identifier;

the master device forwards the device disconnect request via links between the master device and each device to each device;

each device excluding the first device deletes, based on the received device disconnect request, all the remote service configuration items including the first device identifier from its own service configuration information.

The present application further discloses a device for configuring inter-device services, comprising:

a mount request transmitting unit, whereby the first device issues a service mount request including a service identifier of a service provided by a first device and a first device identifier and transmits the service mount request via inter-device links to each device interconnected with a master device;

a service configuration storage unit, whereby each device excluding the first device generates, based on the received service mount request, a remote service configuration item including the first device identifier and a service identifier of a service provided by the first device and adds the remote service configuration item to its own service configuration information.

In some embodiments, the device comprises:

an unload request transmitting unit, whereby after the service configuration storage unit completes the remote service configuration item adding operation, the first device issues a service unload request including a service identifier of the service to be unloaded and transmits the service unload request via an inter-device link to each device interconnected with a master device;

a first service configuration deleting unit, whereby each device excluding the first device deletes, based on the received service unload request, the remote service configuration item including the service identifier from its own service configuration information.

In some embodiments, the device comprises:

a device disconnect request sending unit, whereby after the service configuration storage unit completes the remote service configuration item adding operation, the first device sends a device disconnect request to the master device, the device disconnect request including a first device identifier;

a device disconnect request forwarding unit, whereby the master device forwards the device disconnect request via links between the master device and each device to each device;

a second service configuration deleting unit, whereby each device excluding the first device deletes, based on the received device disconnect request, all the remote service configuration items including the first device identifier from its own service configuration information.

The present application further discloses a process for broadcasting inter-device information, comprising:

a first device that is running a first application program issues a broadcast request of the first application program and transmits the broadcast request via inter-device links to each device interconnected with a master device;

each device excluding the first device sends the received broadcast request to an application program that the application program includes;

In some embodiments, the inter-device links include: links established separately by each different device with the devices through a link port provided by the master device.

The present application further discloses a device for broadcasting inter-device information, comprising:

a broadcast request transmitting unit, whereby a first device that is running a first application program issues a broadcast request of the first application program and transmits the broadcast request via inter-device links to each device interconnected with a master device;

a broadcast request reporting unit, whereby each device excluding the first device sends the received broadcast request to an application program that the application program includes.

The present application discloses at least the following benefits:

With the process for inter-device service access, an access request of a first program for a specific service is issued by a source device running the first program and is transmitted through an inter-device link to a target device that provides the specific service. The target device forwards the received access request to a second program running the target device, and the second program executes the corresponding service function. In some embodiments, the inter-device link comprises: a link established separately by each different device with a master device through a link port provided by the master device.

When the above process is performed, each device establishes a link with a master device through a link port provide by the master device. This process corresponds to forming a virtual device bus between various devices, and can implement a cross-device service access functions based on the device bus. Thus, part of the capability of a single device can become a standardized function module for other device services, making inter-device function combinations possible and thus forming more complex and flexible function systems.

BRIEF DESCRIPTION OF THE DRAWINGS

Various embodiments of the invention are disclosed in the following detailed description and the accompanying drawings.

DETAILED DESCRIPTION

Figure 1:
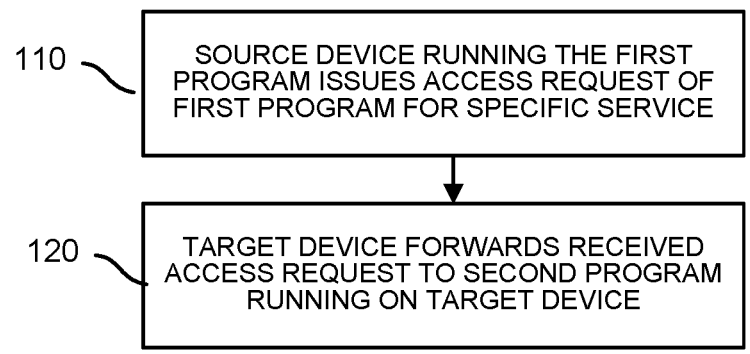
FIG. 1 is a flowchart of an embodiment of a process for inter-device service access.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present embodiment provides a process for inter-device service access. The process includes the following: a master device provides a link port, which corresponds to providing an external access slot to a virtual device bus. The virtual device bus relates to a one Device Bus in concept, the virtual device bus can be implemented via a network socket or any other kind of interface based on the link port provided by the master device. Slave devices can provide services for other devices or can provide cross-device access to services that can link to a master device through the link port, i.e., access the device bus. A service access request of a first program on a device can be transmitted via the device bus (inter-device link) to another device that provides the service, and a second program on that device can execute the corresponding service function, thus achieving a cross-device service access function. The link port can be implemented by any kind of device connection method, such as Wi-Fi, Bluetooth, etc. The virtual device bus is an expansion of the D-Bus concept from an intra-device connection method to an inter-device connection method, and the inter-device link is similar to the virtual device bus and can include physical link methods, such as, for example Wi-Fi, Bluetooth, etc. In addition, since the master device provides a device bus, newly added devices that provide external services or that need cross-device access service can, by sending a request to the master device link port, quickly connect to the device bus and access another device on the device bus without having to separately link to the other device. This process reduces network complexity, simplifies the process for inter-device service access, and increases execution efficiency.

The devices involved can be divided between master device and slave devices based on how the device bus is maintained. A master device is the device that creates the device bus. A slave device is a device that connects to the device bus. Prior to implementing the process, a link can be established between a master device and a slave device. For example, the master device creates a link port for establishing a link with a slave device. Creating the link port corresponds to creating a device bus. The slave device sends a link request to the link port to connect to the device bus. The master device establishes a data connection with the slave device based on the received link request. In addition, each data connection can correspond to a device identifier of the slave device and thus complete the linking process between the slave device and the master device. This linking process can also be called linking the slave device to the bus. Subsequently, the slave device can transmit, based on the link with the master device, a message to the master device. The master device can then forward, based on a target device identifier included in the message, the message using the established corresponding link.

The terms "link" and "data connection" are similar in meaning as used in the present application. The terms differ only in their perspective. "Link" relates to a connection centered on the master device, and "data connection" relates to a connection between two points.

As an example, the master device presets a link authorization, e.g., a password, to ensure that only reliable devices can connect to the device bus. The slave device can also preset the link authorization. In the event that the slave device sends a request to the link port, the link is to include a link authorization. The master device can establish a link relationship with the slave device only after the master device has verified that the link authorization is correct. Similarly, after the master device establishes a link relationship with the slave device, the master device can send a successful link response to the slave device and include ID information, e.g., ID certificate, in the response. Thus, the slave device can confirm the identity of the master device and send various types of messages, such as service mount requests and access requests, to the master device in subsequent operations.

Please note that the data connection between the master device and the slave device can be established using TCP or UDP. The link port can be a preset TCP port or UDP port. In another example, the port can be established using another network protocol.

In this process, the device on which the program that provides the service in an inter-device service access process is located is called a target device. The device on which the program that issues the access request is located is called the source device. For example, the application program can also be run on a master device. In some embodiments, the source device in a process for inter-device service access can be the master device, the target device can be the master device, or neither the source device nor the target device is the master device.

The process for inter-device service access includes: issuing, by a source device running a first program, an access request of the first program for a specific service and transmitting the access request through an inter-device link to a target device that provides the specific service; forwarding, by the target device, the received access request to a second program running on the target device, and executing, by the second program, the corresponding service function. The first program that issues the access request is typically an application program. The second program that provides the specific service can be an application program or a system program.

The following is an explanation of the process for transmitting an access request to a target device via an inter-device link. In the event that the source device is a master device, the source device (master device) can, from among the established links to itself, select a link established with a target device to send an access request to the target device. In the event that the target device is a master device, the source device can use an already established link with the target device (master device) to send an access request to the target device. In the event that neither the source device nor the target device is a master device, the source device can send an access request to the master device based on an already established link with the master device, and the master device can forward the access request to the target device based on an already established link with the target device.

The following application scenario can be considered: among various devices that are interconnected by a device bus, only the second program located on the target device externally provides the specific service. Thus, after the first program, which is located on the source device, that is to access the specific service issues an access request, the access request can be sent via the inter-device link to the target device based on a preset, fixed mode without having to encapsulate the target device identifier and the identifier of the specific service, and the target device triggers the second program to execute the corresponding service function.

The example application scenario can become more complex. Multiple programs can provide multiple services on more than one device, and the application program on each device can access different services according to need. In such a situation, service configuration information can be pre-stored in each device. For a specific device, the service configuration information can include two service configuration items: a local service configuration item and a remote service configuration item. The information of the local service configuration item includes: an identifier (e.g., the process handle) of the local program that provides the service and a service identifier (used to differentiate different services on the device, e.g., service name or service serial number) of the service provided. In other words, each service has a corresponding service identifier. The information in the remote service configuration item includes: a device identifier of another device and a service identifier of service provided by the other device. In other words, each remote service configuration item describes one service. Since this type of service is not provided by a local program, but by another device, this type of service is called a remote service, and service configuration information is called a remote service configuration item. Descriptive information about the corresponding service can also be included in the local service configuration item and the remote service configuration item.

With the service configuration information, the source device can learn the identifier of the target device providing the service based on the service identifier of the accessed service. Moreover, the source device can encapsulate this information in the access request. In the event that the inter-device link is used to transmit the access request, the master device, based on the target device identifier included in the access request, can decide to execute inter-device forwarding or execute forwarding between the inside and the outside of the device and thereupon transmit the access request to the target device. After receiving the access request, the target device can learn the identifier of the program process providing the service from the service configuration information and forward the access request to the correct program process. For example, the service configuration information on the device can be configured by the device administrator via a configuration interface, the service configuration information can be generated by retrieving a configuration file, or in another way.

As an aspect, to generate device service configuration information with greater flexibility and reflect the service information provided by the various devices interconnected via a device bus, the present application discloses a process for implementing dynamic mounting service via a device bus. In other words, devices interconnected via the device bus can transmit the service information that the devices provide through the device bus to other devices on the device bus.

In some embodiments, a second program running on the target device registers the service that the target device provides in the service configuration information of the target device and thus generates a local service configuration item in the service configuration information of the target device. Subsequently, a service mount request can be generated based on the target device identifier and the service identifier of the specific service included in the local service configuration item. The target device issues the service mount request to request the specific service. As an example, the service mount request corresponds to a D-Bus message sent to a bus control module of the master device, this D-Bus messages contains the information, such as the target device identifier and the specific service identifier. Upon receiving the service request mount message, the master device is to add one item to its local service configuration. The service mount request is transmitted via inter-device links to each device interconnected with the master device. For example, in the event that the target device is not the master device, the target device sends the service mount request to the master device, and the master device forwards the mount request through the device bus (i.e., the links established between the master device and each device) to all the other devices, which is the equivalent of a single broadcasting process. The source device, which is included among the devices other than the target device, generates, based on the received service mount request, a remote service configuration item including the target device identifier and the specific service identifier, and adds the remote service configuration item to its own service configuration information.

Similarly, in the event that the target device is a master device, the target device can directly broadcast the service mount request via a device bus to all other devices. All of the devices (including the source device) can thereupon generate the corresponding remote service configuration item in their own service configuration information.

The master device and each device interconnected with the master device can use the service mounting technique described above to notify other devices on the device bus. In other words, each device on the device bus can learn of the services provided by other devices. As an example, a specialized module, such as Service Manager (SM), is responsible for managing service configuration information. Each device can have its own SM. This module can be responsible for generating local service configuration items in the service configuration information based on local program registration. This module can also be responsible for generating remote service configuration items in the service configuration information based on service mount requests from other devices. Moreover, this module can provide a service configuration information querying function. For example, regarding the source device, this module looks up the corresponding target device identifier based on a service identifier of a specific service. Regarding a target device, the module can look up the identifier of the corresponding second program based on the service identifier of the specific service included in the received access request.

As an example, the SM issues a service mount request upon detecting that a local service configuration item has been added to the service configuration information. For example, after each program starts on a target device, the SM typically is to register the services provided with the SM. After the target device establishes a link with the master device, the SM can issue a service mount request based on service information in the local service configuration item and thus broadcast the local service information in full-quantity form to other devices on the bus. The full-quantity form corresponds to all the items in the local service configuration list of the device. In addition, in the event that the target device starts a new program or a new process provided by an already started program, the target device is to likewise register the new program or the new process with the SM. After detecting that a new local service configuration item has been added, the SM can again issue a service mount request and broadcast the service information in increased-quantity form to other devices on the bus. Please note that in the event that a program is registered with the SM, the SM can also include the attribute of whether the service can be provided externally. Thus, the SM can issue a service mount request only for service information that can be provided externally.

As an example, to shield details of the device bus from upper layer applications, device bus-related operations that are executed by the master device and slave devices in specific function modules can be individually encapsulated. For example, a bus control module (also called BusHost module) that is responsible for creating link ports and for establishing data connections with slave devices can be encapsulated in a master device based on received link requests and forward messages between different devices and forward messages between the host device and other devices based on the established links. A bus client module (also called BusClient module) that is responsible for establishing a data connection with a master device by sending a link request to a link port and forwarding messages between the host device and the master device based on the established link can be encapsulated in a slave device. The messages include: service mounting messages and access messages.

Regarding a master device, all of its programs, its SM module, and its bus control module typically run in the form of processes. In some embodiments, the various processes perform message forwarding and other operations with each other via the local bus, e.g., D-Bus. Other IPC mechanisms can be used to implement inter-process communication.

In some embodiments, the service configuration information of the source device includes a remote service configuration item having the following information as a result of the above service mounting process: the target device identifier and a service identifier of the specific service. The service configuration information of the target device includes one local service configuration item having the following information: a service identifier of the specific service and an identifier of the second program process providing the specific service. Upon this foundation, the process provided by the present embodiment can be executed as follows: a first program on a source device accesses a service provided by a second program on a target device. A specific implementation of the process for inter-device service access is described below.

FIG. 1 is a flowchart of an embodiment of a process for inter-device service access. In some embodiments, the process 100 in implemented by a source device 210 of FIG. 2 and comprises:

In 110, the source device running the first program issues an access request for a specific service and transmits the access request through an inter-device link to a target device that provides the specific service. In some embodiments, the issuing of an access request corresponds to generating an access request.

In operation 110, the source device encapsulates the access request based on pre-stored service configuration information, issues the access request, and transmits the access request via an inter-device link in accordance with the target device identifier included in the access request to the target device that provides the specific service, the access request including a service identifier of the specific service of the first program and the target device identifier.

At least three possible situations exist: the source device issuing the access request corresponds to a master device, the target device providing the specific service corresponds to a master device, and neither the source device nor the target device corresponds to a master device. These three situations are described as below.

In a first situation, the source device corresponds to a master device.

Figure 2:
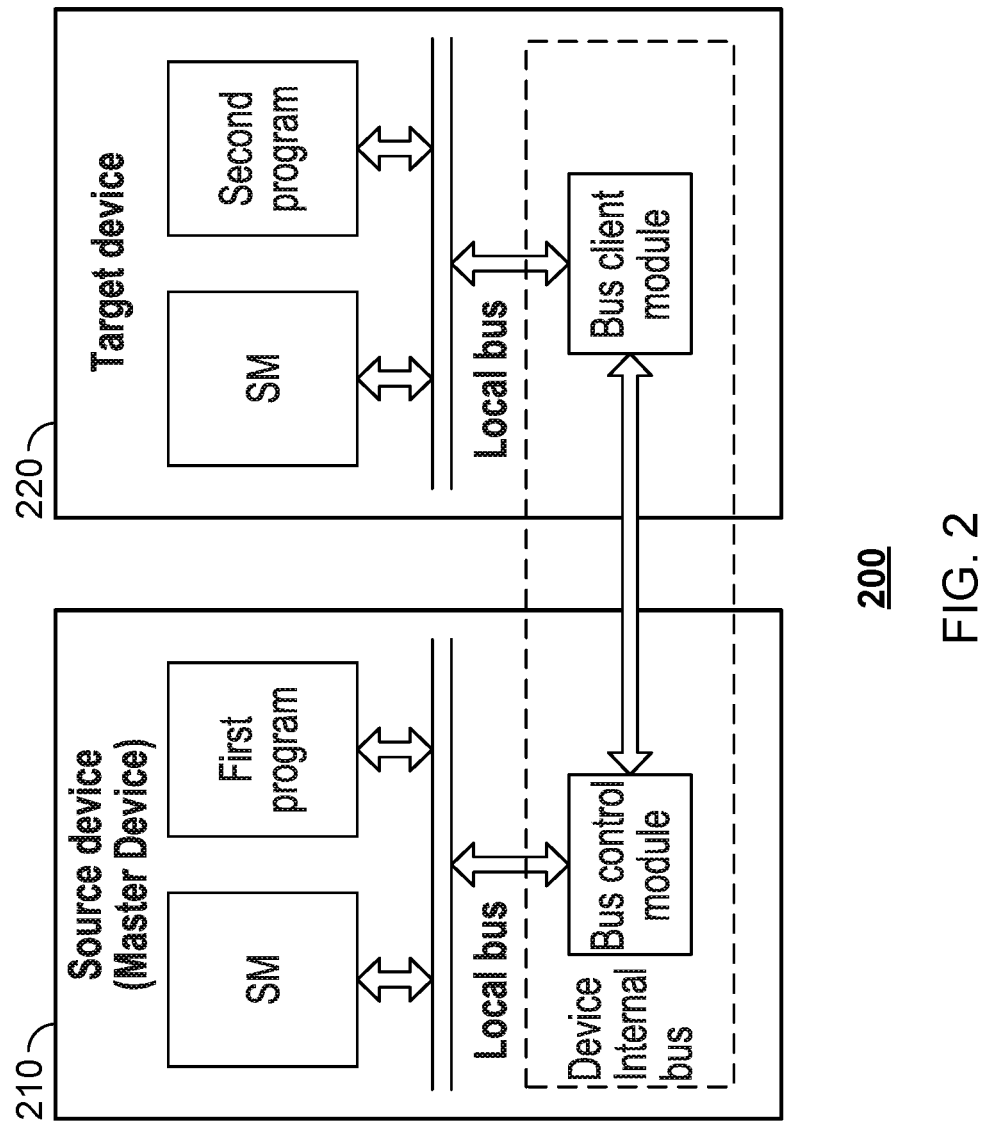
FIG. 2 is a structural diagram of an embodiment of a system for inter-device service access including a source device and a target device where the source device is a master device.
Figure 3:
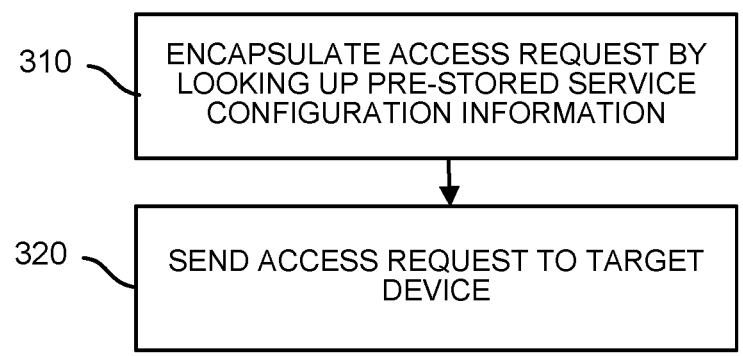
FIG. 3 is a flowchart of an embodiment of a process for transmitting an access request to a target device.

FIG. 2 is a structural diagram of an embodiment of a system for inter-device service access including a source device and a target device where the source device is a master device. In some embodiments, the system 200 includes a source device 210 and a target device 220. FIG. 3 is a flowchart of an embodiment of a process for transmitting an access request to a target device. In some embodiments, the process 300 in implemented by a source device 210 of FIG. 2, is an implementation of operation 110 of FIG. 1, and comprises:

In 310, the source device encapsulates an access request by looking up pre-stored service configuration information, the access request including a service identifier of the specific service of the first program and a target device identifier.

Referring back to FIG. 2, a first program on a source device can generate an access request for a specific service. As an example, using the phone as the source device, the phone generates a video-play request to the in-vehicle infotainment (IVI) system of a car, the IVI system then plays the video and returns a "play success" response message to the phone. In some embodiments, the access request includes a service identifier (i.e., the service name) of the specific service, and the first program issues a query request to the SM. The SM looks up service configuration information based on the service identifier of the specific service provided by the first program, locates within its remote service configuration item the target device identifier corresponding to the service identifier, and sends the target device identifier back to the first program. The first program can encapsulate the target device identifier for its access request, or the first program can perform encapsulation in a message format recognizable by the target device. The first program thereupon can send the encapsulated access request via a local bus to a bus control module.

Referring back to FIG. 3, in some embodiments, to simplify the code design of the application program and to implement as much code reuse as possible, the process 300 provides an implementation whereby the encapsulation function is split off from the application program and completed by an agent. With such an approach, the application program is unable to determine locations of services, which corresponds to the application program being screened from the difference between accessing a local service and a remote service.

To implement the above approach, the device receiving the service mount request can generate a corresponding agent for each service in the device. In the event that the source device is a master device, the source device, when generating a remote service configuration item including a service identifier of the specific service and a target device identifier as in the above service mounting process, can also generate a corresponding agent in a bus control module. In the event that the source device is not a master device, the source device can generate a corresponding agent in its bus client module. The agent being used to provide the specific service with an agent service can include an encapsulation function. Therefore, the remote service configuration item which is in the service configuration information of the source device and which corresponds to the specific service can also include an identifier of corresponding agent (e.g., agent handle).

Therefore, the implementation of operation 310 can include the following: before issuing an access request for a specific service, the first program on the source device issues a query request to the SM. The SM looks up service configuration information based on a service identifier (e.g., service name) of the specific service provided by the first program, locates in its remote service configuration item the agent identifier corresponding to the service identifier, and sends the agent identifier back to the first program. The first program sends, based on the agent identifier, the access request including the service identifier of the specific service via a local bus to the corresponding agent in a bus control module, and the agent encapsulates the target device identifier for the access request. In some embodiments, the agent also executes other encapsulation operations, such as encapsulating the access request into a message format recognizable by the target device.

In some embodiments, in the event that the SM looks up service configuration information based on a service identifier of a specific service provided by the first program and finds two or more service configuration items corresponding to the service identifier, the SM selects, in accordance with a preset priority level rule, the agent identifier in one of the remote service configuration items and sends the agent identifier back to the first program.

As an example, the first program queries the SM using "serv1," the name of a specific service. In the event that the SM finds two remote service configuration items, which means that two devices each provide a service with the name "serv1," the SM can at this time make a selection in accordance with a preset priority level rule. For example, the SM can select the agent identifier according to service mounting time. In other words, the SM selects the remote service configuration item with the earlier mounting time and then sends back the agent identifier in the selected configuration item back to the first program.

In 320, the source device sends, based on a link already established with the target device, the access request to the target device based on the target device identifier included in the encapsulated access request.

A bus control module of the source device sends, based on an established link with the target device (i.e., a data connection corresponding said target device identifier), the access request to a bus client module of the target device based on the target device identifier included in the encapsulated access request.

As an example, to control the message forwarding function on a device bus, the master device's preset forwarding rule designates the devices between which messages can be forwarded. Thus, because the source device is the master device in this operation, the bus control module extracts the target device identifier from the access request before forwarding the access request and determines, based on the message forwarding rule, whether the bus control module is configured to send the access request that came from within the source device to the target device. In the event that the bus control module is configured to send the access request to the target device, the bus control module executes the corresponding forwarding operation. Otherwise, the bus control module sends an access failure response back to the first program and does not execute the subsequent operation.

In a second situation, the target device corresponds to a master device.

Figure 4:
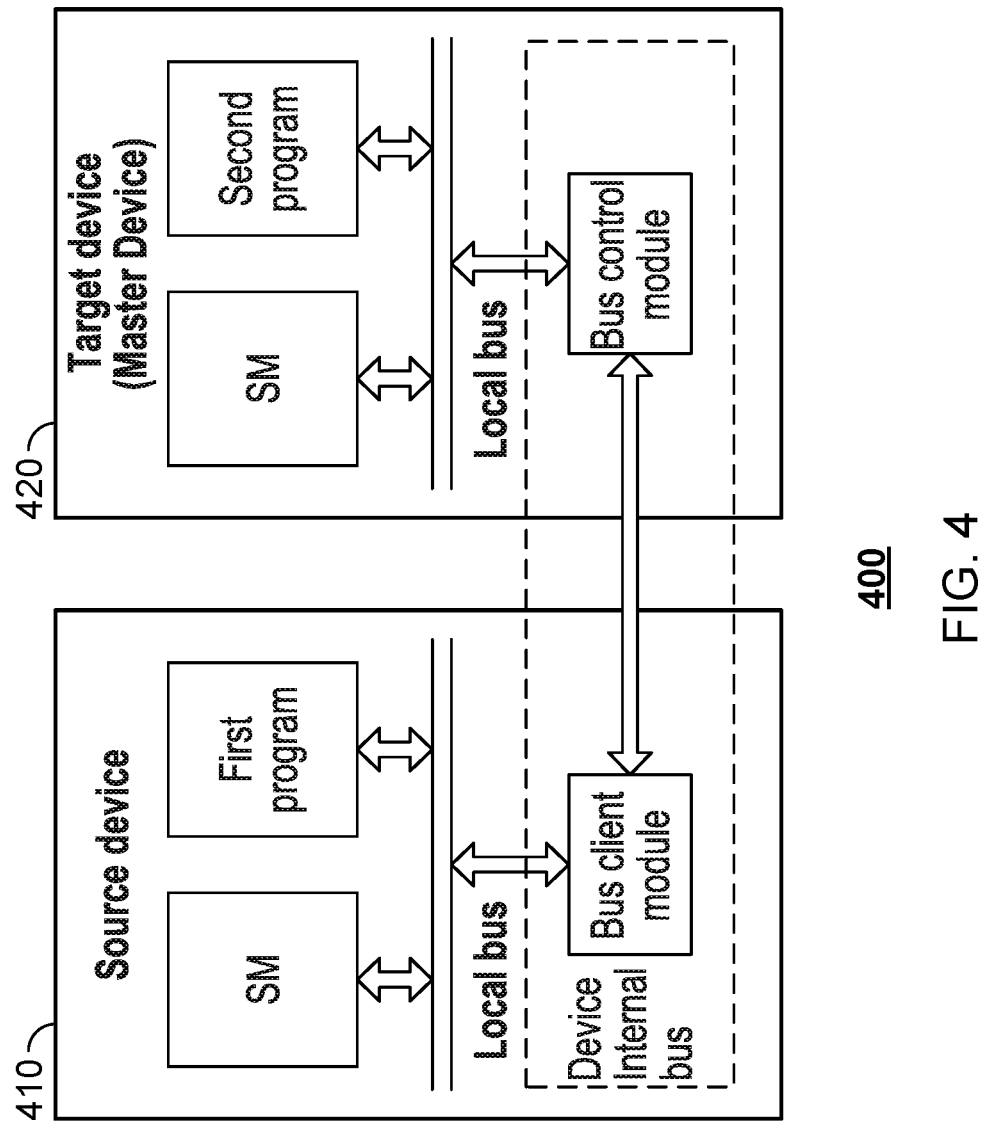
FIG. 4 is a structural diagram of an embodiment of a system for inter-device service access including a source device and a target device where the target device is a master device.
Figure 5:
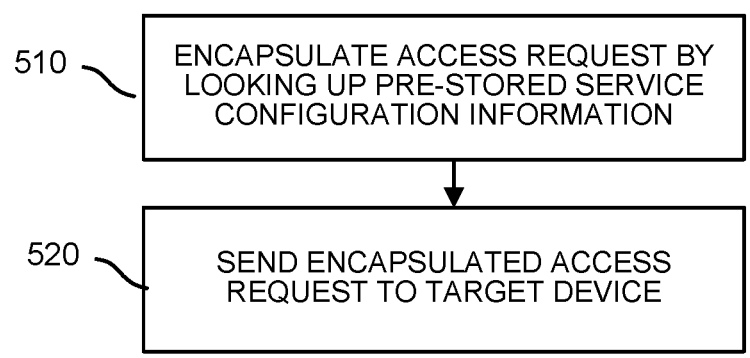
FIG. 5 is a flowchart of another embodiment of a process for transmitting an access request a target device.

FIG. 4 is a structural diagram of an embodiment of a system for inter-device service access where the target device is a master device. In some embodiments, the system 400 includes a source device 410 and a target device 420. FIG. 5 is a flowchart of an embodiment of a process for transmitting an access request to a target device. In some embodiments, the process 500 is implemented by a source device 410 of FIG. 4, is an implementation of operation 110 of FIG. 1, and comprises:

In 510, the source device encapsulates an access request by looking up pre-stored service configuration information. The access request includes a service identifier of the specific service of the first program and a target device identifier. As an example, the source device selects a target device identifier, an expected service identifier, and other information from the service configuration information, then encapsulates the selected information into a request message which is to be sent to the target device corresponding to the target device identifier.

In the event that encapsulation is performed by the first program on its own, the first program can send the encapsulated access request via a local bus to a bus client module. In the event that an agent-based implementation is employed, an agent in the bus client module completes the encapsulation operation of the access request.

In 520, the source device sends the encapsulated access request to the target device based on an established link with the target device.

The bus client module of the source device sends the access request to a bus control module of the target device based on an established link with the target device (i.e., a data connection between the source device and the master device).

After receiving the access request, the bus control module of the target device (master device) determines, based on the target device identifier included in the access request, that its own device is the target device of the access request. Therefore, the bus control module of the target device (master device) does not forward the access request to another device.

In addition, because the target device is a master device, the bus control module can determine, according to a preset message forwarding rule, whether the bus control module is configured to send, i.e., transmit via the local bus, the access request received from the source device to the target device. In the event that the bus control module is not configured to send the access request, then the bus control module sends an access failure response to the source device and does not execute the subsequent operation.

In a third approach, neither source device nor target device is a master device.

Figure 6:
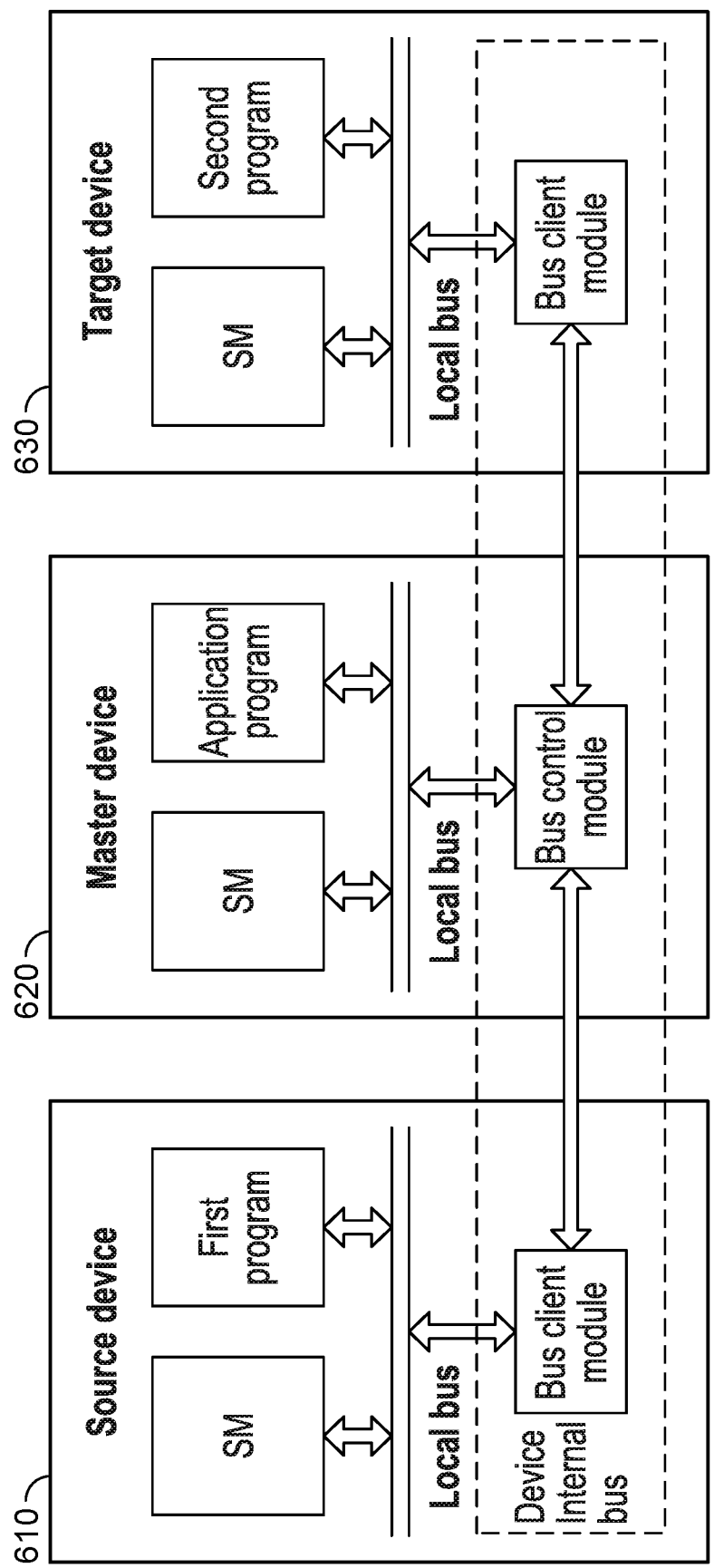
FIG. 6 is a structural diagram of an embodiment of system for inter-device service access including a source device, a master device, and a target device where neither the source device nor the target device is a master device.
Figure 7:
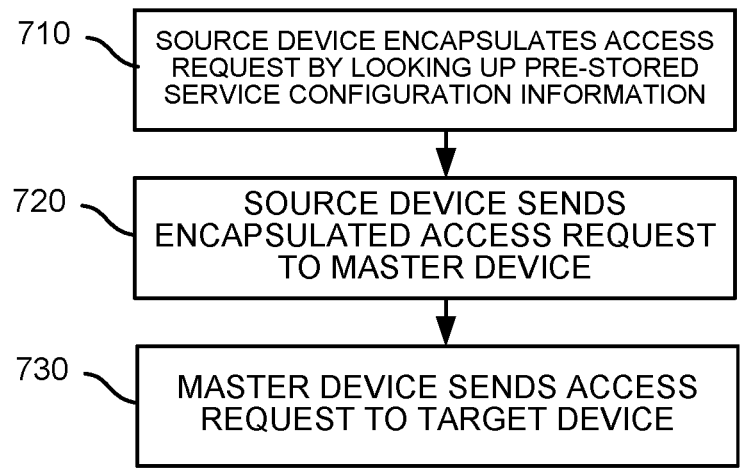
FIG. 7 is a flowchart of yet another embodiment of a process for transmitting an access request a target device.

FIG. 6 is a structural diagram of an embodiment of system for inter-device service access including a source device, a master device, and a target device where neither the source device nor the target device is a master device. In some embodiments, the system 600 includes a source device 610, a master device 620, and a target device 430. FIG. 7 is a flowchart of an embodiment of a process for transmitting an access request to a target device. In some embodiments, the process 700 is implemented by a source device 610 of FIG. 6, is an implementation of operation 110 of FIG. 1, and comprises:

In 710, the source device encapsulates an access request by looking up pre-stored service configuration information. In some embodiments, the access request includes an identifier of a specific service of a first program and a target device identifier.

In the event that encapsulation is performed by the first program on its own, the first program can send the encapsulated access request via a local bus to a bus client module. In the event that an agent-based implementation is employed, an agent in the bus client module completes the encapsulation of the access request.

In 720, the source device sends the encapsulated access request to the master device based on an established link with the master device.

The bus client module of the source device sends, based on an established link with the master device (i.e., a data connection between the source device and the master device), the access request to a bus control module of the master device.

In 730, the master device sends, based on an established link with the target device, the access request to the target device based on the target device identifier included in the received access request.

After receiving the access request, a bus control module of the master device can forward, based on an established link with the target device (i.e., a data connection corresponding to the target device identifier), the access request to a bus client module of the target device.

By the same token, the bus control module of the master device can extract the target device identifier from the access request before performing the forwarding operation and determine, based on a preset message forwarding rule, whether the bus control module is configured to forward the access request from the source device to the target device. In the event that the bus control module is configured to forward the access request from the source device to the target device, the bus control module executes the corresponding forwarding operation. Otherwise, the bus control module sends an access failure response back to the source device and does not perform the subsequent operation.

Referring back to FIG. 1, in 120, the target device forwards the received access request to a second program running on the target device, and the second program executes the corresponding service function.

In operation 120, the target device can forward, based on pre-stored service configuration information, the access request to the second program running on the target device, and the second program executes a corresponding service function.

Figure 8:
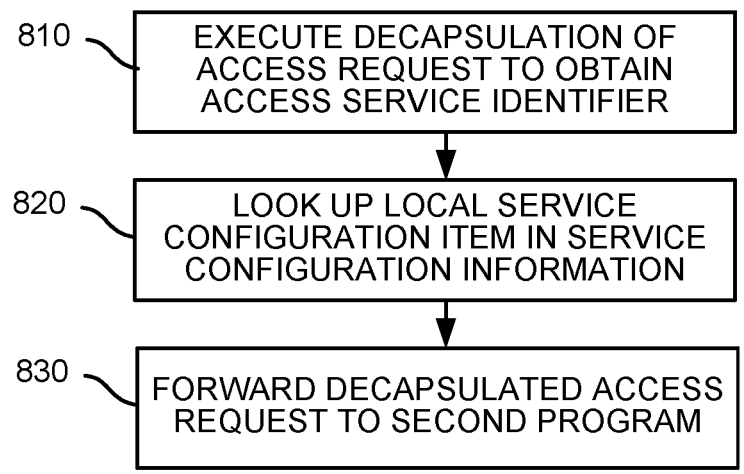
FIG. 8 is a flowchart of an embodiment of a process for forwarding an access request to a program.

FIG. 8 is a flowchart of an embodiment of a process for forwarding an access request to a program. In some embodiments, the process 800 is an implementation of operation 120 of FIG. 1 and comprises:

In 810, the target device, after receiving the access request, executes a decapsulation of the access request to obtain an access service identifier.

In the event that the target device is a master device, a bus control module receives the access request. In the event that the target device is a slave device, a bus client module receives the access request. For convenience, these two modules are both called bus interface modules. The bus interface module performs a decapsulating operation on a received access request to obtain the accessed service identifier included in the access request, i.e., the service identifier of the specific service accessed by the first program.

In 820, the target device looks up, based on the accessed service identifier, a local service configuration item in the service configuration information and acquires the identifier of a second program process that provides the corresponding service.

The bus interface module queries the SM via a local bus. The SM locates, based on the service identifier included in the query request, in the local service configuration item a process identifier corresponding to the service identifier, i.e., an identifier, such as a process handle, of the second process that provides the specific service.

In 830, the target device forwards, based on the identifier of the second program process, the decapsulated access request to the second program, and the second program executes a corresponding service function.

The bus interface module sends the decapsulated access request via a local bus to the second program based on the identifier of the second program process. After receiving the access request, the second program executes the corresponding operation and provides the specific service.

As an example, after the second program receives the access request from the first program, the second program can send the corresponding response information back to the first program so that the first program can execute the corresponding processing. For example, where the target device is a master device, the process of sending back the response information can include: the second program sending response information to the bus control module; the bus control module sending response information, via the link between the source device and the target device, to a bus client module of the source device, and the bus client module of the source device sending the response information to the first program.

An implementation of process 100 of FIG. 1 has been described via operations 110 and 120. Process 100 can be implemented via cascaded links between multiple master devices. In other words, the number of master devices can be greater than 1, each device is cascaded relative to each other, and each non-master device is subordinate to one master device. The inter-device links comprise: links established separately by each different device with a master device through a link port provided by its master device and cascaded links between master devices. The above cascaded architecture facilitates access to, and management of, a greater number of devices and enables access to inter-device services.

For example, by activating a link port and creating device bus ABUS, device A becomes a master device, and several other devices are linked on ABUS. Device B also activates a link port and creates device bus BBUS, in which device B is the master device. Several other devices are linked to BBUS. Device B can also link to ABUS through the link port of device A, i.e., device A and device B are cascade-linked. In another example, the master device A creates the device bus ABUS, and the device B links to ABUS as a slave device. As an aspect, the slave device B on ABUS also can be a master device and create device bus BBUS, which the slave devices of device B can link to, so device A and device B are cascade-linked. A message forwarding rule can be set on device B to implement the forwarding of messages between the device buses ABUS and BBUS (including forwarding service mount requests and forwarding service access requests). Devices linked to the ABUS bus can access services provided by devices on the BBUS bus, and devices linked to the BBUS bus can access services provided by devices on the ABUS bus. Thus, a cross-device service access process can be implemented on cascaded architecture.

As an example, the process is applied to a scenario where cross-device service access is to be performed. The process can be applied in a system deployed within a limited space and thus be able to provide users with more intuitive and faster service functions. For example, the process can be applied in a vehicle-mounted system or a home entertainment system. Each of these two application scenarios are described below.

In a vehicle-mounted system, an on-board control device is configured to, as the master device, create a virtual device bus. A smart phone, an on-board speaker device, an on-board hard drive, an on-board Digital Versatile Disc (DVD), and other such devices all are linked to the device bus. Thus, each device can mutually access service functions provided to each other. For example, the on-board speaker device provides audio playing service, and an application program on the smart phone is to access the audio playing service. The smart phone can send an access request via the device bus to the on-board speaker device. The access request includes relevant data that is to be played as audio, such as an audio data file or relevant resource address information. The access request can be transmitted via the inter-device link to the on-board speaker device. The on-board speaker device forwards the received access request to an audio playing program that runs on the smart phone. The audio playing program executes the corresponding audio playing function and thus provides audio playing service for the smart phone connected to the vehicle-mounted system. Similarly, a smart phone can access a video playing service provided by an on-board DVD device and a data storage service provided by an on-board hard drive. The access technique is similar to the above audio playing service and will not be discussed further for conciseness.

In a home entertainment system, a smart television can, as the master device, create a device bus. A smart phone, a tablet computer, and other such devices are all linked to the device bus. Thus, each device can mutually access service functions provided to each other. For example, the television provides video playing service, and an application program on the smart phone is to access the video playing service. The smart phone can send an access request via the device bus to the smart television. The access request includes relevant data for playing video, such as a video data file or relevant resource address information. The access request is transmitted via an inter-device link to the smart television. The smart television forwards the received access request to a video playing program that runs on the smart phone. The video playing program executes the corresponding video playing function and thus provides video playing service for the smart phone connected to the family entertainment system.

In the access process, each device establishes a link with the master device through a link port provide by the master device. This process corresponds to forming a virtual device bus between various devices, and can implement cross-device service access functions based on the device bus. Thus, part of the capability of a single device can become a standardized function module for serving other devices, making inter-device function combinations possible and thus forming more complex and flexible function systems.

As an example, in applying this process to a system deployed in limited space, such as a vehicle-mounted system or a home entertainment system, the fact that a cross-device access system is implemented based on a device bus means that, on one hand, user privacy can be better protected because the number of accessed devices is limited and, on the other hand, the user can be provided with a more intuitive, closer service experience because all the devices are within a limited space. For example, user experience can be significantly enhanced by increased audiovisual playing effects.

Figure 9A:
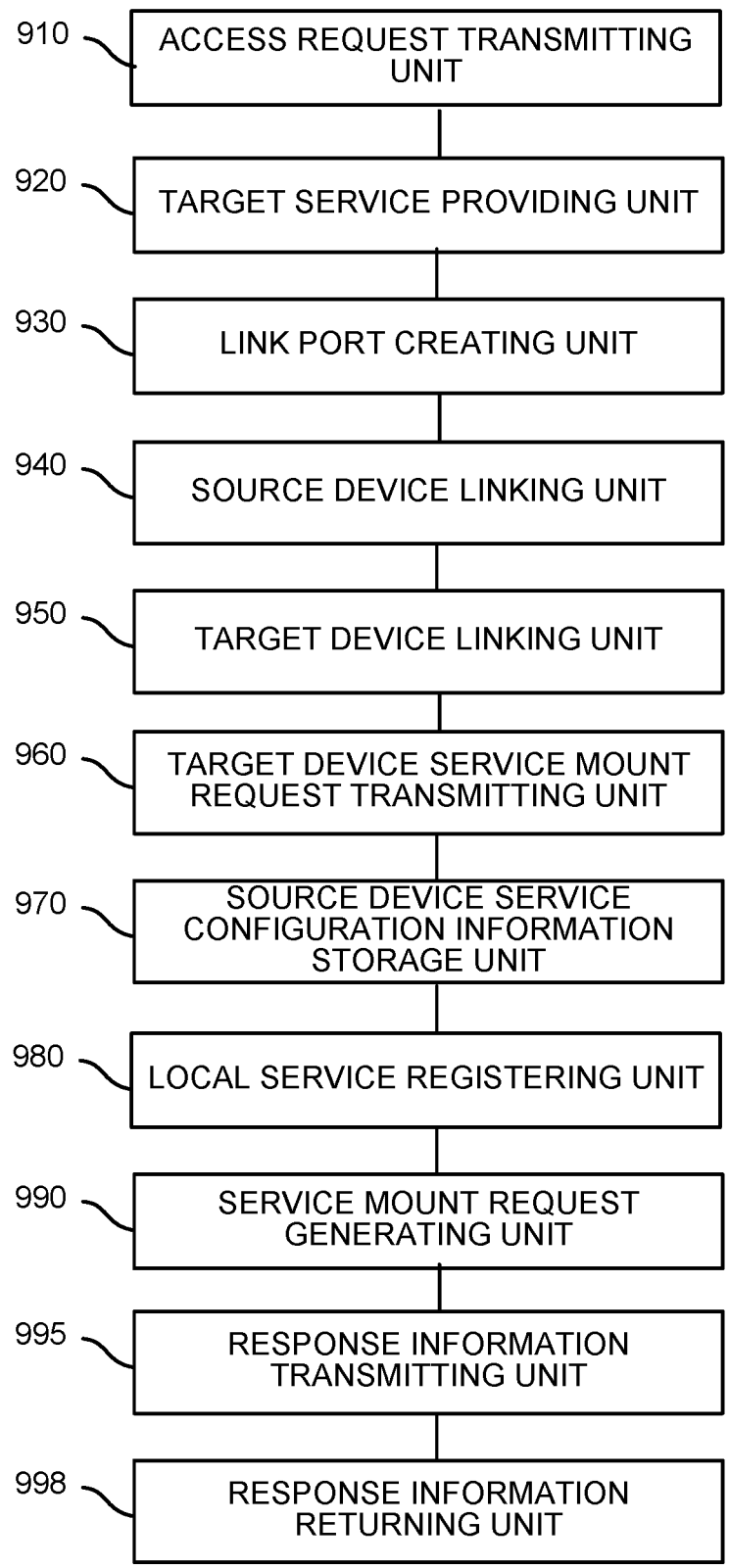
FIG. 9A is a diagram of an embodiment of a device for inter-device service access.

The present application discloses a device for inter-device service access. FIG. 9A is a diagram of an embodiment of a device for inter-device service access. In some embodiments, the device 900 is configured to implement the process 100 of FIG. 1 and comprises: an access request transmitting unit 910 and a target service providing unit 920.

In some embodiments, the access request transmitting unit 910, whereby a source device running a first program issues an access request of the first program for a specific service and transmits the access request through an inter-device link to a target device that provides the specific service.

In some embodiments, the target service providing unit 920, whereby the target device forwards the received access request to a second program running on the target device, and the second program executes the corresponding service function.

In some embodiments, the device further comprises: a link port creating unit 930, a source device linking unit 940, and a target device linking unit 950.

In some embodiments, the link port creating unit 930, whereby the master device creates a link port for establishing links with other devices.

In some embodiments, the source device linking unit 940, whereby in the event that the source device is a non-master slave device, the source device sends a link request to the link port, and the master device establishes a data connection based on the received link request between the master device and the source device to complete the linking process between the source device and master device.

In some embodiments, the target device linking unit 950, whereby in the event that the target device is a non-master slave device, the target device sends a link request to the link port, and the master device establishes a data connection based on the received link request between the master device and the target device to complete the linking process between the target device and master device.

In some embodiments, the access request transmitting unit 910 is further configured to: the source device encapsulates an access request based on pre-stored service configuration information and issues the access request, and transmits the access request via an inter-device link based on the target device identifier included in the access request to the target device that provides the specific service; the access request includes a service identifier of the specific service of the first program and the target device identifier;

In some embodiments, the target service providing unit 920 is further configured to: the target device forwards the access request to the second program running on the target device based on pre-stored service configuration information, and the second program executes a corresponding service function.

In some embodiments, the device further comprises: a target device service mount request transmitting unit 960 and a source device service configuration information storage unit 970.

In some embodiments, the target device service mount request transmitting unit 960, whereby the target device issues a service mount request including the target device identifier and a service identifier of the specific service and transmits the service mount request via the inter-device links to various devices including the source device.

In some embodiments, the source device service configuration information storage unit 970, whereby the source device generates, based on the received service mount request, a remote service configuration item including the target device identifier and the service identifier of the specific service and adds the remote service configuration item to its own service configuration information.

In some embodiments, the device further comprises: a local service registering unit 980 and a service mount request generating unit 990.

In some embodiments, the local service registering unit 980, whereby the second program registers the specific service that it itself provides in the service configuration information of the target device and generates, within the service configuration information, a corresponding local service configuration item;

In some embodiments, the service mount request generating unit 990 is configured to generate the service mount request based on the specific service identifier included in the local service configuration item and the target device identifier.

Figure 9B:
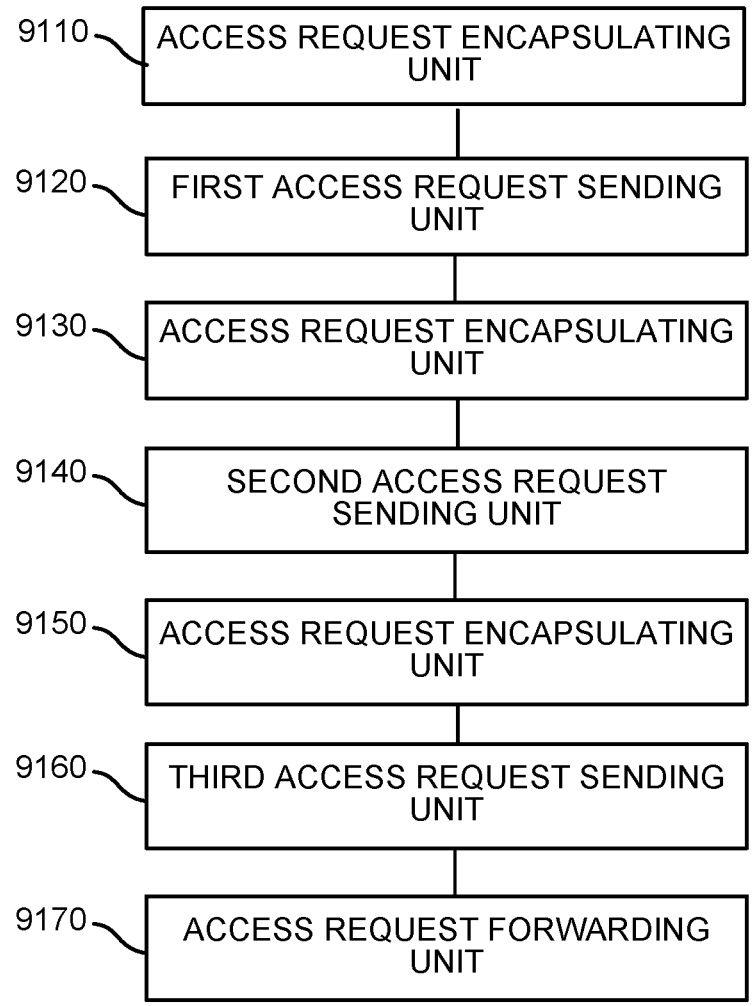
FIG. 9B is a diagram of an embodiment of an access request transmitting unit.

FIG. 9B is a diagram of an embodiment of an access request transmitting unit. In some embodiments, the access request transmitting unit 9100 is an implementation of the access request transmitting unit 910 of FIG. 9A and comprises: an access request encapsulating unit 9110 and a first access request sending unit 9120.

In some embodiments, the access request encapsulating unit 9110, whereby the source device encapsulates an access request by looking up pre-stored service configuration information, and the access request includes a service identifier of the specific service of the first program and the target device identifier.

In some embodiments, the first access request sending unit 9120, whereby the source device sends, based on an established link with the target device, the access request to the target device based on the target device identifier included in the encapsulated access request.

In some embodiments, the access request transmitting unit 9100 further comprises: an access request encapsulating unit 9130 and a second access request sending unit 9140

In some embodiments, the access request encapsulating unit 9130, whereby the source device encapsulates an access request by looking up pre-stored service configuration information; the access request includes a service identifier of the specific service of the first program and the target device identifier;

In some embodiments, the second access request sending unit 9140, whereby the source device sends the encapsulated access request to the target device based on an established link with the target device.

In some embodiments, the access request transmitting unit 9100 further comprises: an access request encapsulating unit 9150, a third access request sending unit 9160, and an access request forwarding unit 9170.

In some embodiments, the access request encapsulating unit 9150, whereby the source device encapsulates an access request by looking up pre-stored service configuration information; the access request includes a service identifier of the specific service of the first program and the target device identifier;

In some embodiments, the third access request sending unit 9160, whereby the source device sends, based on an established link with the master device, the encapsulated access request to the master device;

In some embodiments, the access request forwarding unit 9170, whereby the master device sends, based on an established link with the target device, the access request to the target device based on the target device identifier included in the received access request.

Figure 9C:
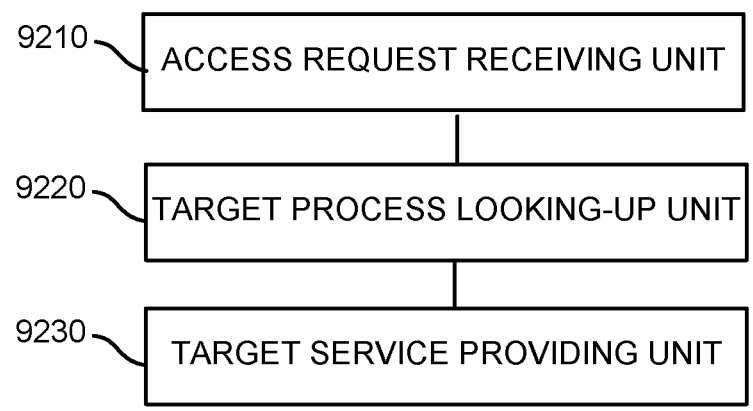
FIG. 9C is a diagram of an embodiment of a target service providing unit.

FIG. 9C is a diagram of an embodiment of a target service providing unit. In some embodiments, the target service providing unit 9200 corresponds to the target service providing unit 920 of FIG. 9A and comprises: an access request receiving unit 9210, a target process looking-up unit 9220, and a target service providing unit 9230.

In some embodiments, the access request receiving unit 9210, whereby the target device, after receiving the access request, executes a decapsulating operation and acquires the accessed service identifier.

In some embodiments, the target process looking-up unit 9220, whereby the target device looks up, based on the accessed service identifier, a local service configuration item in service configuration information and acquires the identifier of a second program process that provides the corresponding service.

In some embodiments, the target service providing unit 9230, whereby the target device forwards the decapsulated access request to the second program based on the identifier of the second program process, and the second program executes the corresponding service function.

Figure 9D:
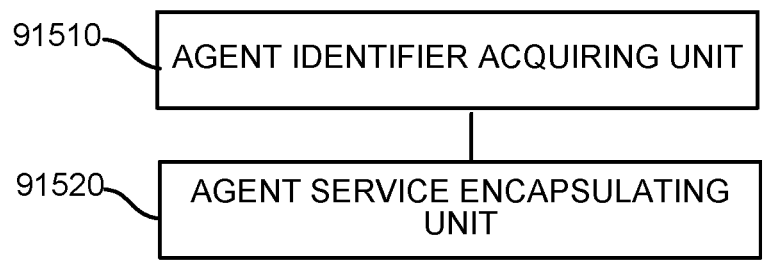
FIG. 9D is a diagram of an embodiment of an access request encapsulating unit.

FIG. 9D is a diagram of an embodiment of an access request encapsulating unit. In some embodiments, the access request encapsulating unit 91500 is an implementation of the the access request encapsulating unit 9150 of FIG. 9B and comprises: an agent identifier acquiring unit 91510 and an agent service encapsulating unit 91520.

In some embodiments, the agent identifier acquiring unit 91510, whereby the first program looks up service configuration information based on the service identifier of the specific service and acquires the agent identifier for providing agent service for accessing the specific service.

In some embodiments, the agent service encapsulating unit 91520, whereby the first program sends, based on the agent identifier, an access request including the service identifier of the specific service to the corresponding agent, and the agent encapsulates the target device identifier for the access request.

Referring back to FIG. 9A, in some embodiments, the device 900 further comprises: a response information transmitting unit 995 and a response information returning unit 998.

In some embodiments, the response information transmitting unit 995, whereby, after the target service providing unit completes execution of its function, the target device issues second program response information regarding the access request and transmits the access request via the inter-device link to the source device.

In some embodiments, the response information returning unit 998, whereby the source device sends the received response information back to the first program.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 10:
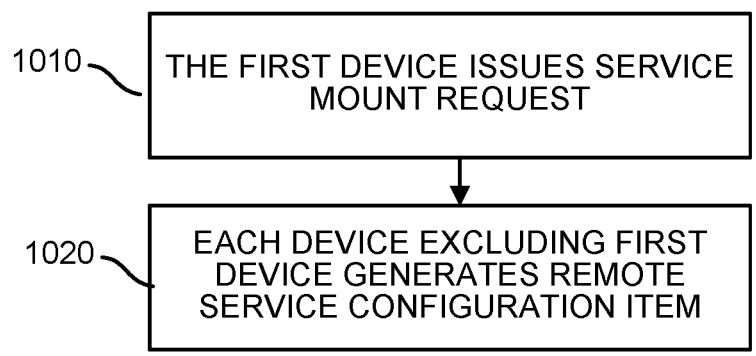
FIG. 10 is a flowchart of an embodiment of a process for configuring inter-device services.

FIG. 10 is a flowchart of an embodiment of a process for configuring inter-device services. In some embodiments, the process 1000 is implemented by a source device 210 of FIG. 2 and comprises:

In 1010, the first device issues a service mount request including a service identifier of a service provided by a first device and a first device identifier, and transmits the service mount request via inter-device links to each device interconnected with a master device.

In some embodiments, the inter-device link includes: a link established separately by each different device with the master device through a link port provided by the master device.

The first device can generate the service mount request as following: application programs running on the first device register services that each of the application programs provides in the service configuration information of the first device and generate local service configuration items within the service configuration information; the first device generates the service mount request based on a device identifier of the first device and a service identifier contained in the local service configuration item.

In 1020, each device excluding the first device generates, based on the received service mount request, a remote service configuration item including the first device identifier and a service identifier of a service provided by the first device and adds the remote service configuration item to its own service configuration information.

By performing operation 1020, each device (other than the first device) linked to the device bus created by the master device generates a remote service configuration item for the service provided by the first device. In other words, each device (other than the first device) becomes aware of the service information provided externally by the first device. Thus, the application programs running on each device can access the corresponding service provided by the first device.

Subsequently, the following service unloading operations and device disconnecting operations can be performed, as follows:

(1) Service Unloading Operations

A program on the first device may have to externally discontinue or temporarily cease to provide a service function. In such a situation, the first device issues a service unload request including a service identifier of the to-be-unloaded service and transmits the service unload request via inter-device links to each device interconnected with the master device. Each device other than the first device deletes, based on the received service unload request, the remote service configuration item including the service identifier from its own service configuration information.

As an example, a program which is running on the first device and is to stop or suspend service can first indicate to the SM that the program is canceling the service the program is providing. The SM deletes the corresponding local service configuration item and generates, based on the change in the local service configuration item, a service unload request including the service identifier of the to-be-unloaded service. In the event that the first device is a master device, the SM of the first device sends the service unload request to a bus control module. In the event that the first device is a slave device, the SM of the first device sends the service unload request to a bus client module, and the bus client module sends the service unload request to the bus control module of the master device. The bus control module broadcasts the service unload request to each device based on the device bus. Each device other than the first device sends the received service unload request to its own SM. The SM deletes the remote service configuration item including the service identifier of the to-be-unloaded service from the service configuration information. In the event that an agent corresponding to the to-be-unloaded service was generated earlier, the SM can trigger an operation to delete the corresponding agent.

(2) Device Disconnecting Operations

In the event that the first device is not a master device, the first device can send a device disconnect request to a master device. The device disconnect request includes a first device identifier. The master device forwards the device disconnect request via its connections with each device to each device. Each device excluding the first device deletes, based on the received device disconnect request, all the remote service configuration items including the first device identifier from its own service configuration information.

As an example, a device disconnect instruction is typically issued by a user or the system to the first device. The first device bus client module sends a device disconnect request to a master device. The device disconnect request includes a first device identifier. The master device bus control module forwards the device disconnect request in a broadcasting manner via its links to each device on the device bus. After the bus client module of each device other than the first device receives the device disconnect request, the bus client module sends the device disconnect request to its own SM. The SM of each device deletes the remote service configuration items associated with the first device from the service configuration information. In other words, the SM of each device deletes all remote service configuration items including the first device identifier. In the event that the agents corresponding to the various services provided by the first device were previously generated, the SM can notify the bus client module to delete the corresponding agents.

In addition, the device bus can also be canceled in specific applications. In the event that the first device is a master device, the first device, after receiving a bus cancellation instruction, broadcasts the bus cancellation instruction to each device using the device bus. Each device, based on the received bus cancellation instruction, deletes all the remote service configuration items from its own service configuration information.

As an example, the bus destruction instruction is typically sent by a user or the system to a master device. The bus control module of the first device (master device) broadcasts the bus destruction instruction to each device on the device bus. The bus client module of each device sends the received bus destruction instruction to the SM. The SM deletes all the remote service configuration items from the service configuration information. If agents corresponding to the deleted remote service configuration items exist, then the SM can delete the corresponding agents via the bus control module. Thereafter, the first device can delete the link port and thus complete operations for destroying the device bus.

In some embodiments, where multiple master devices are cascaded, a remote service configuration item in the service configuration information can further include a device bus identifier (such as a device bus name) to indicate the device bus providing the corresponding service. The bus destruction instruction can include a bus identifier for a bus created by the first device. Thus, the SM on each device can delete, based on the received bus destruction instruction, the remote service configuration item associated with the bus identifier from the service configuration information (and advise the bus control module to delete the corresponding agent).

A description of a device bus-based service configuration process was provided above. In some embodiments, the first device can be any device on the device bus. In other words, each device linked to the device bus can execute a mount service, unload service, or disconnect device operation based on its own actual need. The master device can also destroy the device bus. Through the above approach, implementing real-time updates to service configuration information using a device bus is possible, with the result that each device on the device bus can correctly learn about service information provided by other devices. Thus, a reliable basis for cross-device access services can be provided.

Figure 11:
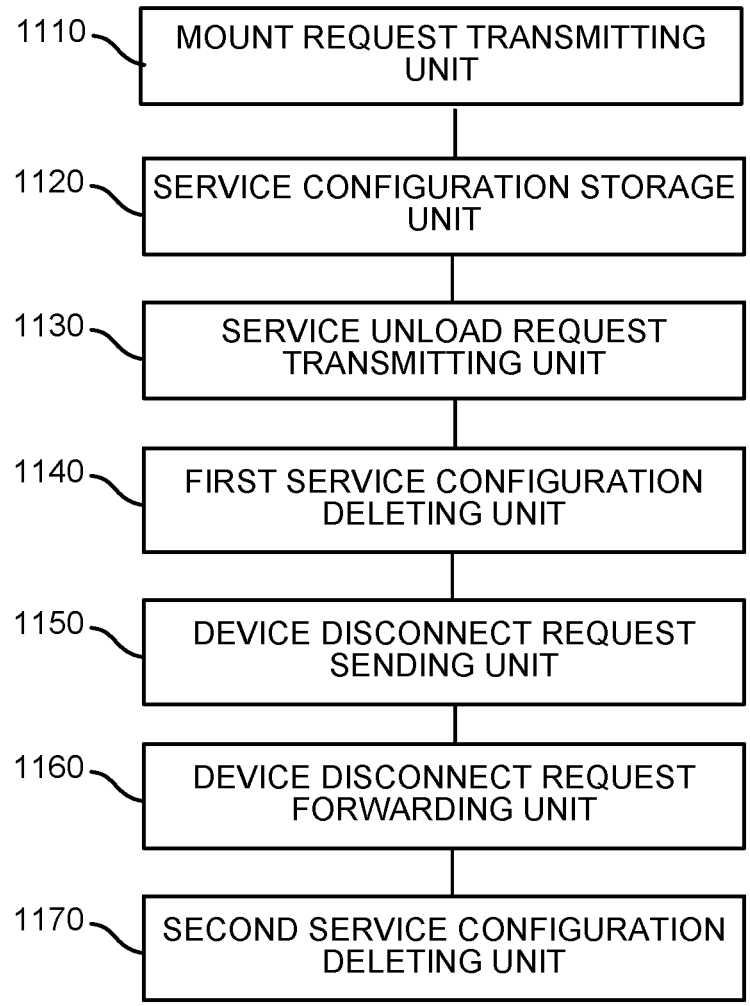
FIG. 11 is a diagram of another embodiment of a device for inter-device service access.

A process for configuring inter-device services was provided above. FIG. 11 is a diagram of an embodiment of a device for configuring inter-device services. In some embodiments, the device 1100 is configured to implement the process 1000 of FIG. 10 and comprises: a mount request transmitting unit 1110 and a service configuration storage unit 1120.

In some embodiments, the mount request transmitting unit 1110, whereby a first device issues a service mount request including a service identifier of a service provided by the first device and a first device identifier, and transmits the service mount request via an inter-device link to each device interconnected with a master device.

In some embodiments, the service configuration storage unit 1120, whereby each device excluding the first device generates, based on the received service mount request, a remote service configuration item including the first device identifier and a service identifier of a service provided by the first device, and adds the remote service configuration item to its own service configuration information.

In some embodiments, the device 1100 further comprises: a service unload request transmitting unit 1130 and a first service configuration deleting unit 1140.

In some embodiments, the service unload request transmitting unit 1130, whereby, after the service configuration storage unit 1120 completes the remote service configuration item adding operation, the first device issues a service unload request including a service identifier of the service to be unloaded and transmits the service unload request via an inter-device link to each device interconnected with a master device.

In some embodiments, the first service configuration deleting unit 1140, whereby each device excluding the first device deletes, based on the received service unload request, the remote service configuration item including the service identifier from its own service configuration information.

In some embodiments, the device 1100 further comprises: a device disconnect request sending unit 1150, a device disconnect request forwarding unit 1160, and a second service configuration deleting unit 1170.

In some embodiments, the device disconnect request sending unit 1150, whereby, after the service configuration storage unit completes the remote service configuration item adding operation, the first device sends a device disconnect request to the master device, the device disconnect request including a first device identifier.

In some embodiments, the device disconnect request forwarding unit 1160, whereby the master device forwards the device disconnect request via links between itself and each device to each device.

In some embodiments, the second service configuration deleting unit 1170, whereby each device excluding the first device deletes, based on the received device disconnect request, all the remote service configuration items including the first device identifier from its own service configuration information.

Figure 12:
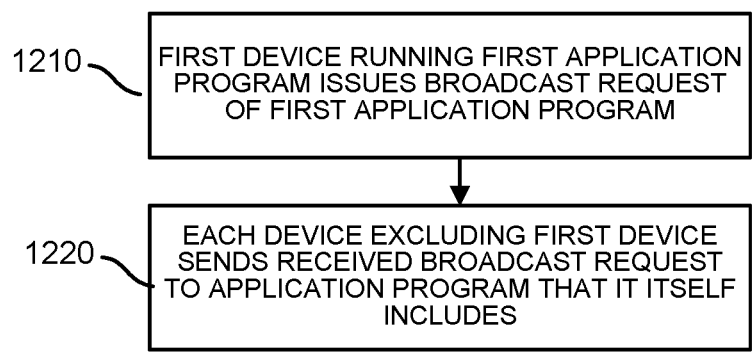
FIG. 12 is a flowchart of an embodiment of a process for broadcasting inter-device information.

FIG. 12 is a flowchart of an embodiment of a process for broadcasting inter-device information. In some embodiments, the process 1200 is implemented by a device 610 of FIG. 6 and comprises:

In 1210, a first device running a first application program issues a broadcast request of the first application program and transmits the broadcast request via inter-device links to each device interconnected with a master device.

The inter-device links comprise: links established separately by each device with the devices through a link port provided by the master device. An example of a first device that is not a master device is used in the explanation below.

The first application program is to broadcast information to application programs on other devices. At this point, the broadcast request can be sent to a bus client module. The broadcast request can include the information to be broadcast. The bus client module of the first device sends the broadcast request to a bus control module of a master device. The bus control module of the master device sends the broadcast request in a broadcast sending mode to each device on the device bus.

In 1220, each device excluding the first device sends the received broadcast request to an application program that it itself includes.

After each device other than the first device (including the master device and each slave device) receives the broadcast request through the bus control module or bus client module, each device other than the first device sends the broadcast request to an application program process that it is carrying. Each application program process can handle the broadcast request based on its own needs. For example, an application program process can extract the broadcast information the broadcast request or directly discard the broadcast request.

A device bus-based information broadcasting process was described. From the above description, the process provides a loose coupling mode of communication, which makes it easy for an application program on a device to declare information or send notices to application programs on other devices. The information broadcasting process is a beneficial supplement to modes of exchanging information between devices.

Figure 13:
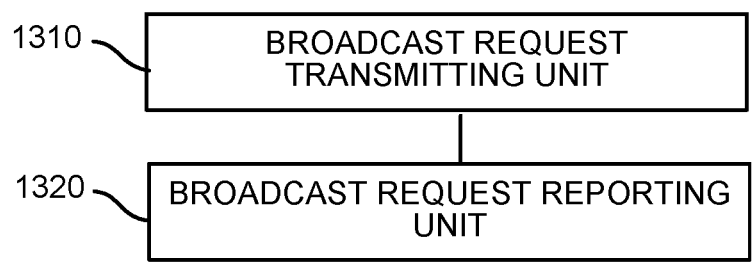
FIG. 13 is a diagram of an embodiment of a device for broadcasting inter-device information.

FIG. 13 is a diagram of an embodiment of a device for broadcasting inter-device information. In some embodiments, the device 1300 is configured to implement the process 1200 of FIG. 12 and comprises: a broadcast request transmitting unit 1310 and a broadcast request reporting unit 1320.

In some embodiments, the broadcast request transmitting unit 1310, whereby a first device running a first application program issues a broadcast request of the first application program and transmits the broadcast request via inter-device links to each device interconnected with a master device.

In some embodiments, the broadcast request reporting unit 1320, whereby each device excluding the first device sends the received broadcast request to an application program that it itself includes.

Figure 14:
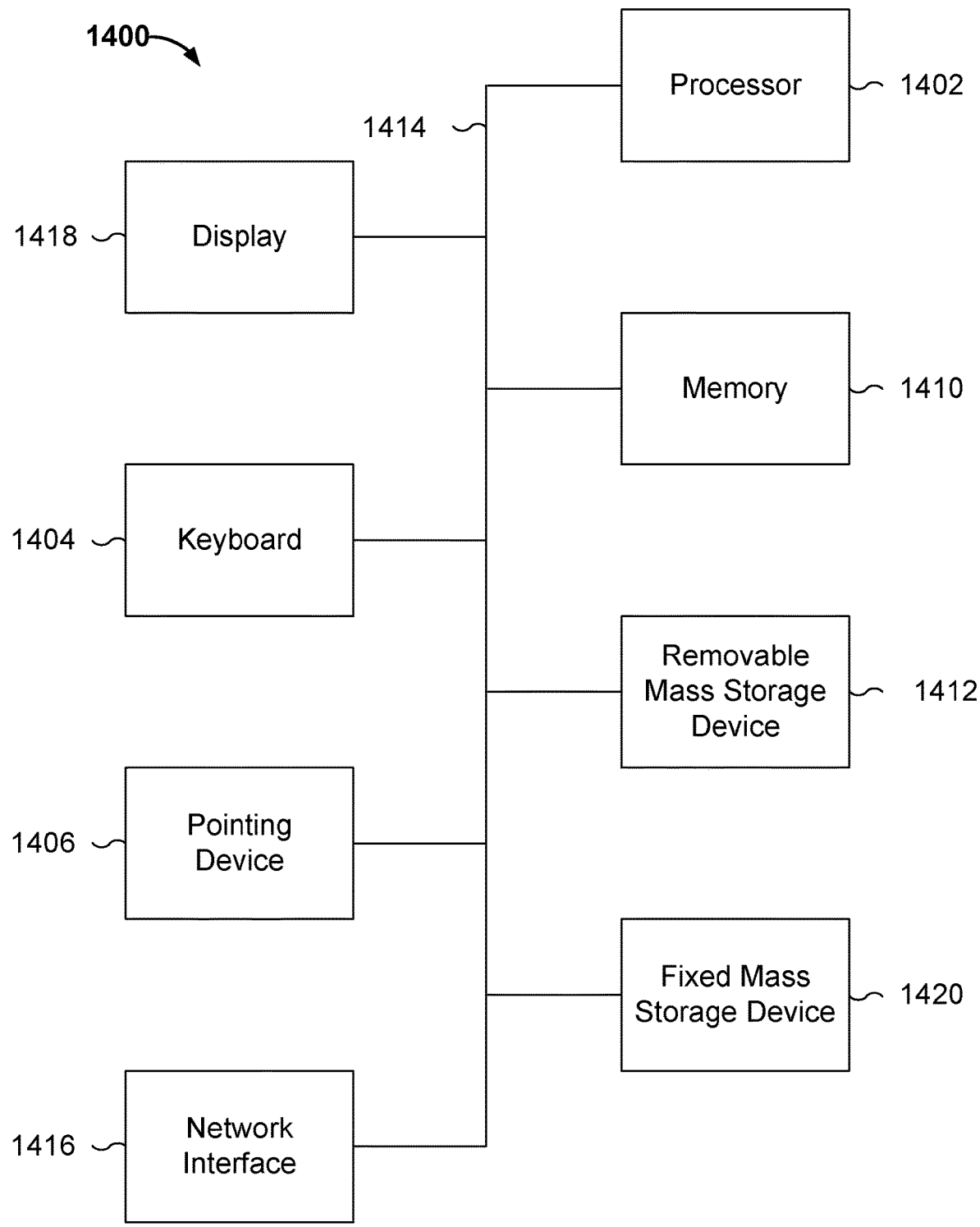
FIG. 14 is a functional diagram illustrating a programmed computer system for inter-device service access in accordance with some embodiments.

FIG. 14 is a functional diagram illustrating a programmed computer system for inter-device service access in accordance with some embodiments. As will be apparent, other computer system architectures and configurations can be used to perform inter-device service access. Computer system 1400, which includes various subsystems as described below, includes at least one microprocessor subsystem (also referred to as a processor or a central processing unit (CPU)) 1402. For example, processor 1402 can be implemented by a single-chip processor or by multiple processors. In some embodiments, processor 1402 is a general purpose digital processor that controls the operation of the computer system 1400. Using instructions retrieved from memory 1410, the processor 1402 controls the reception and manipulation of input data, and the output and display of data on output devices (e.g., display 1418).

Processor 1402 is coupled bi-directionally with memory 1410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1402. Also as is well known in the art, primary storage typically includes basic operating instructions, program code, data and objects used by the processor 1402 to perform its functions (e.g., programmed instructions). For example, memory 1410 can include any suitable computer-readable storage media, described below, depending on whether, for example, data access needs to be bi-directional or unidirectional. For example, processor 1402 can also directly and very rapidly retrieve and store frequently needed data in a cache memory (not shown).

A removable mass storage device 1412 provides additional data storage capacity for the computer system 1400, and is coupled either bi-directionally (read/write) or unidirectionally (read only) to processor 1402. For example, storage 1412 can also include computer-readable media such as magnetic tape, flash memory, PC-CARDS, portable mass storage devices, holographic storage devices, and other storage devices. A fixed mass storage 1420 can also, for example, provide additional data storage capacity. The most common example of mass storage 1420 is a hard disk drive. Mass storages 1412, 1420 generally store additional programming instructions, data, and the like that typically are not in active use by the processor 1402. It will be appreciated that the information retained within mass storages 1412 and 1420 can be incorporated, if needed, in standard fashion as part of memory 1410 (e.g., RAM) as virtual memory.

In addition to providing processor 1402 access to storage subsystems, bus 1414 can also be used to provide access to other subsystems and devices. As shown, these can include a display monitor 1418, a network interface 1416, a keyboard 1404, and a pointing device 1406, as well as an auxiliary input/output device interface, a sound card, speakers, and other subsystems as needed. For example, the pointing device 1406 can be a mouse, stylus, track ball, or tablet, and is useful for interacting with a graphical user interface.

The network interface 1416 allows processor 1402 to be coupled to another computer, computer network, or telecommunications network using a network connection as shown. For example, through the network interface 1416, the processor 1402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

An auxiliary I/O device interface (not shown) can be used in conjunction with computer system 1400. The auxiliary I/O device interface can include general and customized interfaces that allow the processor 1402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 14 is but an example of a computer system suitable for use with the various embodiments disclosed herein. Other computer systems suitable for such use can include additional or fewer subsystems. In addition, bus 1414 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    issuing, by a source device running a first program, an access request by the first program for a specific service, comprising:
        encapsulating the access request based on pre-stored service configuration information, wherein the pre-stored service configuration information includes a first service configuration information of the source device and a second service configuration information of a target device, wherein the first service configuration information of the source device includes at least one remote service configuration item having the following information: a target device identifier of the target device and a service identifier of the specific service, and wherein the second service configuration information of the target device includes at least one local service configuration item comprising: a service identifier of the specific service and a program identifier of a second program providing the specific service; and
        issuing the access request; and
    transmitting, by the source device running the first program, the access request through an inter-device link to the target device that provides the specific service, wherein the target device is configured to receive the access request, forward the received access request to the second program running on the target device, the second program executing a corresponding service function, wherein the inter-device link comprises: links established separately by each different device with a master device through a link port provided by the master device, wherein the transmitting of the access request through the inter-device link to the target device that provides the specific service comprises:
        transmitting the access request through the inter-device link based on the target device identifier included in the access request to the target device that provides the specific service, the access request including a service identifier of the specific service of the first program and the target device identifier.

2. The method as described in claim 1, further comprising:
establishing the inter-device link, comprising:
    creating, using the master device, a link port for establishing links with other devices; and
    in the event that the source device is a non-master slave device:
        sending, using the source device, a link request to the link port; and
        establishing, using the master device, a data connection based on the link request between the master device and the source device to complete a linking process between the source device and master device.

3. The method as described in claim 2, wherein:
the establishing of the data connection based on the link request is executed by a bus control module on the master device; and
the sending of the link request to the link port, and the establishing of the data connection based on the link request between the master device and the target device are executed by a bus client module on the slave device.

4. The method as described in claim 1, wherein:
in the event that the source device is a master device, the transmitting of the access request via an inter-device link based on the target device identifier included in the access request to the target device that provides the specific service comprises:
    encapsulating, using the source device, the access request by looking up pre-stored service configuration information, the access request including a service identifier of the specific service of the first program and the target device identifier; and
sending by the source device, using the established link with the target device, the access request to the target device based on the target device identifier included in the encapsulated access request.

5. The method as described in claim 4, wherein:
information in the remote service configuration item corresponding to the specific service in the service configuration information of the source device further comprises: an agent identifier, an agent corresponding to the agent identifier being generated during generation of the remote service configuration item and responsible for providing agent service, the agent service including an encapsulating function for accessing the specific service; and the encapsulating of the access request comprises:
  looking up, using the first program, service configuration information using the service identifier of the specific service and acquiring the agent identifier for providing the agent service for accessing the specific service; and
  sending, using the first program, an access request including the service identifier of the specific service to the corresponding agent using the agent identifier, the agent encapsulating the target device identifier for the access request.

6. The method as described in claim 5, wherein the looking up of the service configuration information using the service identifier of the specific service and the acquiring of the agent identifier for providing the agent service for accessing the specific service comprises:
  looking up, using the first program, service configuration information using the service identifier of the specific service; and
  in the event that the service configuration information includes two or more remote service configuration items corresponding to the service identifier of the specific service, selecting, in accordance with a preset priority level rule, an agent identifier in one of the remote service configuration items as the agent identifier for providing the agent service for accessing the specific service.

7. The method as described in claim 6, wherein:
  a bus control module on the master device executes operations of the master device, forwards messages between non-master slave devices, forwards messages between the device itself and slave devices, and provides agent service; and
  a bus control module on a slave device executes operations of forwarding messages between the device itself and a master device and providing agent service.

8. The method as described in claim 1, wherein in the event that the target device is a master device, the transmitting of the access request through the inter-device link to the target device that provides the specific service comprises:
  encapsulating, using the source device, the access request by looking up pre-stored service configuration information, the access request including a service identifier of the specific service of the first program and the target device identifier; and
  sending, using the source device, the encapsulated access request to the target device using an established link with the target device.

9. The method as described in claim 1, wherein in the event that neither the source device nor the target device is a master device, the transmitting of the access request through an inter-device link to a target device that provides the specific service comprises:
  encapsulating, using the source device, an access request by looking up pre-stored service configuration information, the access request includes an identifier of the specific service of the first program and the target device identifier;
  sending, using the source device, the encapsulated access request to the master device using an established link with the master device; and
  sending, using the master device, the access request to the target device based on the target device identifier included in the received access request using an established link with the target device.

10. The method as described in claim 1, wherein after the transmitting of the access request, the method further comprises:
  receiving, using the source device, second program response information regarding the access request from the target device via the inter-device link; and
  sending, using the source device, the received response information back to the first program.

11. The method as described in claim 1, wherein:
  the quantity of the master devices is greater than 1;
  the master devices are cascaded relative to each other, each non-master device being subordinate to one master device; and
  inter-device links comprise: links established separately by each different device with a master device through a link port provided by its master device and cascaded links between master devices.

12. The method as described in claim 1, wherein the link port comprises: a TCP port or a UDP port.

13. The method as described in claim 1, wherein:
  the method is implemented by a vehicle-mounted system;
  the specific service comprises: an audio playing service;
  the source device comprises: a smart phone;
  the target device comprises: a vehicle-mounted speaker device;
  the issuing of the access request of the first program for the specific service comprises:
    issuing, by the smart phone running the first program, an access request for the audio playing service; and
  the transmitting of the access request through the inter-device link to the target device that provides the specific service comprises:
    transmitting the access request via the inter-device link to a vehicle-mounted speaker device that provides the audio playing service.

14. The method as described in claim 1, wherein:
  the method is implemented by a vehicle-mounted system;
  the specific service comprises: a video playing service;
  the source device comprises: a smart phone;
  the target device comprises: a vehicle-mounted DVD; and
  the issuing of the access request of the first program for the specific service running the first program comprises:
    issuing the access request of the first program for the video playing service by the smart phone running the first program and transmitting the access request via inter-device links to the vehicle-mounted DVD that provides the video playing service.

15. The method as described in claim 1, wherein:
  the method is implemented by a vehicle-mounted system;
  the specific service comprises: a data storage service;
  the source device comprises: a smart phone;
  the target device comprises: a vehicle-mounted hard disk drive;
  the issuing of the access request of the first program for a specific service by a source device running the first program comprises:
    issuing the access request of the first program for the data storage service by the smart phone running the first program; and
  the transmitting of the access request through the inter-device link to the target device that provides the specific service comprises:
    transmitting the access request via the inter-device link to the vehicle-mounted hard disk drive that provides the data storage service.

16. The method as described in claim 1, wherein:
the method is implemented by a home entertainment system;
the specific service comprises: a video playing service;
the source device comprises: a smart phone;
the target device comprises: a smart television or tablet computer; and
the issuing of the access request of the first program for a specific service by a source device running the first program comprises:
issuing the access request of the first program for the video playing service by the smart phone running the first program and transmitting the access request via the inter-device link to the smart television or the tablet computer that provides the video playing service.

17. A method, comprising:
receiving, using a target device, an access request for a specific service from a source device running a first program through an inter-device link; and
forwarding, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises:
after receiving the access request, executing, using the target device, a decapsulation of the access request to acquire a service identifier;
looking up, using the target device, a local service configuration item in service configuration information using the service identifier and acquiring an identifier of a second program process that provides the corresponding service; and
forwarding, using the target device, the decapsulated access request to the second program using the identifier of the second program, the second program executing a corresponding service function.

18. The method as described in claim 17, further comprising:
establishing the inter-device link, comprising:
creating, using the master device, a link port for establishing links with other devices; and
in the event that target device is a non-master slave device:
sending, using the target device, a link request to the link port; and
establishing, using the master device, a data connection based on the received link request between the master device and the target device to complete the linking process between the target device and master device.

19. The method as described in claim 18, wherein:
the establishing of the data connection based on the received link request is executed by a bus control module on the master device; and
the sending of the link request to the link port, and the establishing of the data connection based on the received link request between the master device and the target device are executed by a bus client module on the slave device.

20. The method as described in claim 17, wherein the forwarding of the received access request to the second program running on the target device comprises:
forwarding the access request to the second program running on the target device based on pre-stored service configuration information.

21. The method as described in claim 20, wherein:
the service configuration information of the target device includes at least one local service configuration item comprising: a service identifier of the specific service and an identifier of the second program providing the specific service.

22. A method, comprising:
receiving, using a target device, an access request for a specific service from a source device running a first program through an inter-device link; and
forwarding, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises:
determining, using the master device, according to a preset message forwarding rule whether the master device can use an inter-device link to forward the access request; and
in response to a determination that the master device can use the inter-device link to forward the access request, executing a corresponding forwarding operation.

23. A method, comprising:
receiving, using a target device, an access request for a specific service from a source device running a first program through an inter-device link;
forwarding, using the target device, the received access request to a second program running on the target device, the second program executing a corresponding service function, wherein the inter-device link comprises: links established separately by each different device with a master device through a link port provided by the master device; and
issuing, using the target device, second program response information regarding the access request and transmitting the second program response information via the inter-device link to the source device.

24. A method implemented by a vehicle-mounted system, comprising:
receiving, using a target device, an access request for a specific service from a source device running a first program through an inter-device link, wherein the target device comprises:
a vehicle-mounted DVD, wherein the source device comprises: a smart phone; and
forwarding, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises:
forwarding, using the vehicle-mounted DVD, the received access request to a video playing program that is running on the vehicle-mounted DVD, the video playing program executing a corresponding video playing function.

25. A method implemented by a vehicle-mounted system, comprising:
receiving, using a target device, an access request for a specific service from a source device running a first program through an inter-device link, wherein the specific service comprises: a data storage service, wherein the source device comprises: a smart phone, and wherein the target device comprises: a vehicle-mounted hard disk drive; and
forwarding, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises:
forwarding, using the vehicle-mounted hard disk drive, the received access request to a data storage program that is running on the vehicle-mounted hard disk drive; and
executing, using the data storage program, a corresponding data storage function.

26. A method implemented by a home entertainment system, comprising:
receiving, using a target device, an access request for a specific service from a source device running a first program through an inter-device link, wherein the specific service comprises: a video playing service, wherein the source device comprises: a smart phone, and wherein the target device comprises: a smart television or tablet computer; and
forwarding, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises:
forwarding, using the smart television or the tablet computer, the received access request to a video playing program that is running on the smart television or the tablet computer; and
executing, using the video playing program, a corresponding video playing function.

27. A system, comprising:
a processor; and
a memory coupled with the processor, wherein the memory is configured to provide the processor with instructions which when executed cause the processor to:
receive, using a target device, an access request for a specific service from a source device running a first program through an inter-device link; and
forward, using the target device, the received access request to a second program running on the target device, the second program executing a corresponding service function, wherein the inter-device link comprises: links established separately by each different device with a master device through a link port provided by the master device, wherein the forwarding of the received access request to the second program running on the target device comprises to:
after receiving the access request, execute, using the target device, a decapsulation of the access request to acquire a service identifier;
look up, using the target device, a local service configuration item in service configuration information using the service identifier and acquiring an identifier of a second program process that provides the corresponding service; and
forward, using the target device, the decapsulated access request to the second program using the identifier of the second program, the second program executing a corresponding service function.

28. A system, comprising:
a processor; and
a memory coupled with the processor, wherein the memory is configured to provide the processor with instructions which when executed cause the processor to:
issue, by a source device running a first program, an access request by the first program for a specific service, comprising to:
encapsulate the access request based on pre-stored service configuration information, wherein the pre-stored service configuration information includes a first service configuration information of the source device and a second service configuration information of a target device, wherein the first service configuration information of the source device includes at least one remote service configuration item having the following information: a target device identifier of the target device and a service identifier of the specific service, and wherein the second service configuration information of the target device includes at least one local service configuration item comprising: a service identifier of the specific service and a program identifier of a second program providing the specific service; and
issue the access request; and
transmit, by the source device running the first program, the access request through an inter-device link to the target device that provides the specific service, wherein the target device is configured to receive the access request, forward the received access request to the second program running on the target device, the second program executing a corresponding service function, wherein the inter-device link comprises: links established separately by each different device with a master device through a link port provided by the master device, wherein the transmitting of the access request through the inter-device link to the target device that provides the specific service comprises to:
transmit the access request through the inter-device link based on the target device identifier included in the access request to the target device that provides the specific service, the access request including a service identifier of the specific service of the first program and the target device identifier.

* * * * *